(12) United States Patent
Wang et al.

(10) Patent No.: US 12,645,091 B2
(45) Date of Patent: Jun. 2, 2026

(54) DISPLAY MODULE AND PROJECTOR

(71) Applicants: BEIJING BOE DISPLAY TECHNOLOGY CO., LTD., Beijing (CN); BOE TECHNOLOGY GROUP CO., LTD., Beijing (CN)

(72) Inventors: Yujie Wang, Beijing (CN); Guangquan Wang, Beijing (CN); Wei Zhang, Beijing (CN); Site Cai, Beijing (CN); Xi Li, Beijing (CN); Jingang Wang, Beijing (CN); Xiaolong Liu, Beijing (CN); Tianyang Han, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 295 days.

(21) Appl. No.: 18/275,204

(22) PCT Filed: Jun. 20, 2022

(86) PCT No.: PCT/CN2022/099958
§ 371 (c)(1),
(2) Date: Jul. 31, 2023

(87) PCT Pub. No.: WO2023/245384
PCT Pub. Date: Dec. 28, 2023

(65) Prior Publication Data
US 2025/0004291 A1     Jan. 2, 2025

(51) Int. Cl.
*G02B 27/18* (2006.01)
*G02F 1/1335* (2006.01)

(52) U.S. Cl.
CPC ....... *G02B 27/18* (2013.01); *G02F 1/133526* (2013.01); *G02F 1/133553* (2013.01)

(58) Field of Classification Search
CPC ............... G02B 27/18; G02F 1/133526; G02F 1/133553
(Continued)

(56) References Cited

U.S. PATENT DOCUMENTS 6,552,760 B1    4/2003  Gotoh et al.
6,771,233 B1    8/2004  Kim
(Continued)

FOREIGN PATENT DOCUMENTS

CN            1154353 C      6/2004
CN        101097394 A      1/2008
(Continued)

OTHER PUBLICATIONS

International Search Report received for PCT Patent Application No. PCT/CN2022/099958, mailed on Feb. 15, 2023, 5 pages (2 pages of English Translation and 3 pages of Original Document).
(Continued)

*Primary Examiner* — Jerry L Brooks
(74) *Attorney, Agent, or Firm* — Myers Bigel, P.A.

(57) ABSTRACT

The application discloses a display module and a projector. The display module includes a light source, a first lens, a second lens, and a display panel, wherein the light source includes a light-emitting area, the display panel includes a display area, the light source emits a first light beam through the light-emitting area, the first lens refracts the first light beam into a second light beam, the second lens refracts the second light beam into a third light beam. The plane where the light-incident surface of the display panel is located includes a first irradiation area, and the first irradiation area includes a first effective irradiation area that is continuously distributed, the first effective irradiation area includes a strongest illumination position therein. The illumination intensity on the outer contour of the first effective irradiation
(Continued)

area is I % of the strongest illumination position, I≥45. The first effective irradiation area covers the display area, and, on the plane where the light incident surface of the display panel is located, any straight line passing through the center point of the display area is intercepted as a first line segment by the outer contour of the first effective irradiation area, and intercepted as a second line segment by the outer contour of the display area, wherein the length ratio of the first line segment to the second line segment is in the range of 1-1.3.

19 Claims, 11 Drawing Sheets

(58) Field of Classification Search
USPC ........................................................... 353/30
See application file for complete search history.

(56) References Cited

U.S. PATENT DOCUMENTS

| | | | | |
|---|---|---|---|---|
| 7,618,162 | B1 | 11/2009 | Parkyn et al. | |
| 9,377,675 | B2 | 6/2016 | Matsubara | |
| 2004/0227910 | A1 | 11/2004 | Akiyama et al. | |
| 2006/0250579 | A1* | 11/2006 | Silverstein | H04N 9/315 |
| | | | | 348/E9.027 |
| 2007/0296926 | A1* | 12/2007 | Takauchi | G02B 3/0043 |
| | | | | 353/38 |
| 2012/0249621 | A1 | 10/2012 | Miura | |
| 2019/0204781 | A1 | 7/2019 | Gao et al. | |
| 2020/0142291 | A1* | 5/2020 | Nishikawa | G03B 21/28 |
| 2020/0348461 | A1 | 11/2020 | Meng et al. | |

FOREIGN PATENT DOCUMENTS

| | | | |
|---|---|---|---|
| CN | 102707553 | A | 10/2012 |
| CN | 102866500 | A | 1/2013 |
| CN | 103363443 | A | 10/2013 |
| CN | 106444252 | A | 2/2017 |
| CN | 108983498 | A | 12/2018 |
| CN | 110543014 | A | 12/2019 |
| CN | 110832377 | A | 2/2020 |
| CN | 108196437 | B | 11/2020 |
| CN | 113917579 | A | 1/2022 |
| JP | 2000-241755 | A | 9/2000 |
| JP | 2000-330200 | A | 11/2000 |
| JP | 2004045718 | A | 2/2004 |
| JP | 2010107704 | A | 5/2010 |
| WO | 2020/088576 | A1 | 5/2020 |

OTHER PUBLICATIONS

The First Office Action corresponding to Chinese Patent Application No. 202280001821.X (Foreign Text, 8 Pages, English Translation Thereof, 6 Pages), mailed Apr. 1, 2026.

Xia, Lei, "Design of the LED Optical Freeform Lens", China Excellent Master's Theses Full-Text Database (Engineering & Technology II), Cnki, 73 pp., Jan. 15, 2018.

\* cited by examiner

DISPLAY MODULE AND PROJECTOR

RELATED APPLICATIONS

The present application is a 35 U.S.C. 371 national stage application of PCT International Application No. PCT/CN2022/099958, filed on Jun. 20, 2022, the entire disclosure of which is incorporated herein by reference.

FIELD

This application relates to the technical field of optics and projection display, and in particular to a display module and projector.

BACKGROUND

In the related technologies, the main means of realizing projection display is to let the light emitted by the light source irradiate and pass through the display area of a display panel, so as to project the patterns and colors displayed on the display area onto the receiving surface (such as a curtain). In some projection devices, optical elements such as lenses may be placed in the light path from the light source to the display panel in order to direct the light from the light source for the benefit of the display. However, these optical elements generally have deficiencies so their performance (e.g., optical efficiency, illuminance, etc.) cannot meet people's requirements.

SUMMARY

According to an aspect of the present disclosure, there is provided a display module, comprising a light source, a first lens, a second lens, and a display panel, wherein the light source comprises a light emitting area, and the display panel comprises a display area, wherein the light source is configured to emit a first light beam to the first lens through the light emitting area, wherein the first lens is configured to receive the first light beam, refract the first light beam into a second light beam, and emit the second light beam to the second lens, wherein the second lens is configured to receive the second light beam, refract the second light beam into a third light beam, and emit the third light beam to the display panel; wherein a plane where a light-incident surface of the display panel is located comprises a first irradiation area, the first irradiation area comprises a first effective irradiation area that is continuously distributed, the first effective irradiation area comprises a strongest illumination position therein, and an illumination intensity on an outer contour of the first effective irradiation area is I % of an illumination intensity of the strongest illumination position, wherein I≥45; wherein the first lens and the second lens are configured such that the first effective irradiation area covers the display area, and, on the plane where the light-incident surface of the display panel is located, any straight line passing through a center point of the display area is intercepted by the outer contour of the first effective irradiation area as a first line segment, and is intercepted by an outer contour of the display area as a second line segment, wherein a length ratio of the first line segment to the second line segment is in a range of 1-1.3.

In some embodiments, on the plane where the light-incident surface of the display panel is located, a difference between a length of the first line segment and a length of the second line segment is in a range of 0-30 mm.

In some embodiments, the second lens comprises a second light-incident surface and a second light-exit surface, the second light beam comprises a second irradiation area on a plane where the second light-incident surface is located, the second irradiation area comprises a second effective irradiation area, the second effective irradiation area is mapped as the first effective irradiation area on the plane where the light-incident surface of the display panel is located by the second lens, wherein the second lens is configured such that an area of the second effective irradiation area is 90% to 110% of an area of the display area.

In some embodiments, a shape of an outer contour of the light emitting area is same as a shape of the outer contour of the display area.

In some embodiments, the outer contour of the first effective irradiation area is a trapezoid, and the outer contour of the display area is a rectangle, a long side and a short side of the trapezoid are respectively in parallel with two sides of the outer contour of the display area, and legs of the trapezoid are angled with other two sides of the outer contour of the display area.

In some embodiments, the first lens comprises a first light-incident surface and a first light-exit surface, the first light-incident surface is configured to receive the first light beam, the first light-exit surface is configured to emit the second light beam to the second lens, the second lens comprises a second light-incident surface and a second light-exit surface, and an outer contour of the light emitting area is a rectangle; wherein a first coordinate system is defined with a center point of the light emitting area being an origin point, a straight line where a diagonal line of the light emitting area is located being a x-axis, and an central normal of the light emitting area being a y-axis, wherein, in the first coordinate system, a first ray emitted by the light source to the first lens is refracted into a second ray by the first light-incident surface, and the second ray is refracted into a third ray by the first light-exit surface, wherein an intercepted line of an effective light-exit area of the first light-exit surface on the first coordinate system is a first intercepted line, and any point $(x_1, y_1)$ on the first intercepted line follows a following equation:

$$\begin{cases} x_1 = \dfrac{h - G - T_{ix1}\sin\beta_{i1} + S_{ix1}\sin\theta_{i1}}{\sin\theta_{i1} - \sin\beta_{i1}} + M \\ y_1 = \left( \dfrac{h - G - T_{ix1}\sin\beta_{i1} + S_{ix1}\sin\theta_{i1}}{\sin\theta_{i1} - \sin\beta_{i1}} - S_{ix1} \right) \sin\theta_{i1} + G + N \end{cases}$$

wherein h is a distance between the second light-incident surface and the light emitting area, G is a distance between the light emitting area and the first light-incident surface, $S_{ix1}$ is a distance from an intersection point of the first ray and the first light-incident surface to the central normal of the light emitting area, $T_{ix1}$ is a distance from an intersection point of the third ray and the second light-incident surface to the central normal of the light emitting area, $\beta_{i1}$ is an angle between the third ray and the central normal of the light emitting area, $\theta_{i1}$ is an angle between the second ray and the central normal of the light emitting area, M and N are constants, wherein 0≤M≤4, 0≤N≤4.

In some embodiments, the first lens comprises a first light-incident surface and a first light-exit surface, the first light-incident surface is configured to receive the first light beam, the first light-exit surface is configured to emit the second light beam to the second lens, the second lens comprises a second light-incident surface and a second light-exit surface, and an outer contour of the light emitting area is a rectangle; wherein a second coordinate system is defined with a center point of the light emitting area being an origin point, an extension direction of a long side of the light emitting area being a direction of an x-axis, and a central normal of the light emitting area being a y-axis, wherein, in the second coordinate system, a first ray emitted by the light source to the first lens is refracted into a second ray by the first light-incident surface, and the second ray is refracted into a third ray by the first light-exit surface, wherein an intercepted line of an effective light-exit area of the first light-exit surface on the second coordinate system is a second intercepted line, and any point $(x_2, y_2)$ on the second intercepted line follows a following equation:

$$\begin{cases} x_2 = \dfrac{h - G - T_{ix2}\sin\beta_{i2} + S_{ix2}\sin\theta_{i2}}{\sin\theta_{i2} - \sin\beta_{i2}} + P \\ y_2 = \left(\dfrac{h - G - T_{ix2}\sin\beta_{i2} + S_{ix2}\sin\theta_{i2}}{\sin\theta_{i2} - \sin\beta_{i2}} - S_{ix2}\right)\sin\theta_{i2} + G + Q \end{cases}$$

wherein h is a distance between the second light-incident surface and the light emitting area, G is a distance between the light emitting area and the first light-incident surface, $S_{ix2}$ is a distance from an intersection point of the first ray and the first light-incident surface to the central normal of the light emitting area, $T_{ix2}$ is a distance from an intersection point of the third ray and the second light-incident surface to the central normal of the light emitting area, $\beta_{i2}$ is an angle between the third ray and the central normal of the light emitting area, $\theta_{i2}$ is an angle between the second ray and the central normal of the light emitting area, P and Q are constants, wherein $0 \leq P \leq 3$, $0 \leq Q \leq 3$.

In some embodiments, the first lens comprises a first light-incident surface and a first light-exit surface, the first light-incident surface is configured to receive the first light beam, the first light-exit surface is configured to emit the second light beam to the second lens, the second lens comprises a second light-incident surface and a second light-exit surface, and an outer contour of the light emitting area is a rectangle; wherein a third coordinate system is defined with a center point of the light emitting area being an origin point, an extension direction of a short side of the light emitting area being a direction of an x-axis, and a central normal of the light emitting area being an y-axis, wherein, in the third coordinate system, a first ray emitted by the light source to the first lens is refracted into a second ray by the first light-incident surface, and the second ray is refracted into a third ray by the first light-exit surface, wherein an intercepted line of an effective light-exit area of the first light-exit surface on the third coordinate system is a third intercepted line, and any point $(x_3, y_3)$ on the third intercepted line follows a following equation:

$$\begin{cases} x_3 = \dfrac{h - G - T_{ix3}\sin\beta_{i3} + S_{ix3}\sin\theta_{i3}}{\sin\theta_{i3} - \sin\beta_{i3}} + C \\ y_3 = \left(\dfrac{h - G - T_{ix3}\sin\beta_{i3} + S_{ix3}\sin\theta_{i3}}{\sin\theta_{i3} - \sin\beta_{i3}} - S_{ix3}\right)\sin\theta_{i3} + G + V \end{cases}$$

wherein h is a distance between the second light-incident surface and the light emitting area, G is a distance between the light emitting area and the first light-incident surface, $S_{ix3}$ is a distance from an intersection point of the first ray and the first light-incident surface to the central normal of the light emitting area, $T_{ix3}$ is a distance from an intersection point of the third ray and the second light-incident surface to the central normal of the light emitting area, $\beta_{i3}$ is an angle between the third ray and the central normal of the light emitting area, $\theta_{i3}$ is an angle between the second ray and the central normal of the light emitting area, C and V are constants, wherein $0 \leq C \leq 2$, $0 \leq V \leq 2$.

In some embodiments, the first light-incident surface is a flat plane, and the first light-exit surface is a curved surface.

In some embodiments, the outer contour of the display area and an outer contour of the light emitting area are rectangles, the second lens comprises a second light-incident surface and a second light-exit surface, a distance h between the second light-incident surface and the light emitting area follows a following equation:

$$h = \left(\dfrac{A}{2} - \dfrac{B}{2} - \dfrac{G}{\tan(90 - \alpha)} - L\tan\gamma\right) \cdot \tan(90 - \beta) + G + K$$

wherein A is a length of a diagonal line of the display area, B is a length of a diagonal line of the light emitting area, G is a distance between the light emitting area and the first lens, L is a distance between an center point of the light-incident surface of the display area and a center point of the second light-incident surface of the second lens, $\alpha$ is an effective divergence half angle of the first light beam, $\beta$ is an effective divergence half angle of the second light beam, $\gamma$ is an effective divergence half angle of the third light beam, K is a constant, and K is in a range of $-5$ mm$\leq$K$\leq$5 mm.

In some embodiments, the second lens comprises a second light-incident surface and a second light-exit surface, and a distance h between the second light-incident surface and the light emitting area is in a range of 50 mm$\leq$h$\leq$150 mm.

In some embodiments, a length A of a diagonal line of the display area is in a range of 10 mm$\leq$A$\leq$200 mm.

In some embodiments, a length B of a diagonal line of the light emitting area is in a range of 2 mm$\leq$B$\leq$20 mm.

In some embodiments, a distance G between the light emitting area and the first lens is in a range of 1 mm$\leq$G$\leq$3.5 mm.

In some embodiments, the second lens comprises a second light-incident surface and a second light-exit surface, and a distance L between a center point of the light-incident surface of the display area and a center point of the second light-incident surface is in a range of 6 mm$\leq$L$\leq$16 mm.

In some embodiments, the second lens comprises a second light-incident surface and a second light-exit surface, a focal length F of the second lens follows a following equation:

$$F = \dfrac{\frac{1}{2}A - (h - G)\tan\beta}{\tan\gamma} + E$$

wherein A is a length of a diagonal line of the display area, h is a distance between the second light-incident surface and the light emitting area, G is a distance between the light emitting area and the first lens, E is a constant, $\beta$ is an effective divergence half angle of the second light beam, γ is an effective divergence half angle of the third light beam, wherein −2.5 mm<E≤2.5 mm.

In some embodiments, a focal length F of the second lens is in a range of 50 mm≤F≤200 mm.

In some embodiments, an effective divergence half angle α of the first light beam is in a range of 40°≤α≤65°.

In some embodiments, an effective divergence half angle γ of the third light beam is in a range of 0°≤γ≤10°.

In some embodiments, an effective divergence half-angle β of the second light beam is in a range of 25°≤β≤45°.

In some embodiments, an effective divergence half angle α of the first light beam, an effective divergence half angle β of the second light beam, and an effective divergence half angle γ of the third light beam follow a following equation:

$$\beta=(\alpha+\gamma)/2.$$

In some embodiments, the second lens is a Fresnel lens, and a thickness of the second lens along its optical axis is in a range of 1.5 mm-2 mm.

In some embodiments, the display panel is a liquid crystal display panel.

In some embodiments, the display module further comprises a first reflecting mirror, wherein the first reflecting mirror is at an optical downstream of the first lens and an optical upstream of the second lens, and the first reflecting mirror is configured to reflect the second light beam from the first lens to the second lens.

According to an aspect of the present disclosure, there is provided a projector, comprising the display module according to any embodiment of the present disclosure, a third lens, and a projection lens, wherein the third lens is at an optical downstream of the display module, and the projection lens is at an optical downstream of the third lens.

In some embodiments, the projector further comprises a second reflecting mirror, wherein the second reflecting mirror is configured to reflect a light emitted by the third lens to the projection lens.

BRIEF DESCRIPTION OF DRAWINGS

In order to describe the technical solutions in the embodiments of the present disclosure more clearly, the drawings that need to be used in the embodiments will be briefly introduced below. Apparently, the drawings in the following description are only some embodiments of the present disclosure, and those skilled in the art can obtain other drawings according to these drawings without creative efforts. In the drawings, the same or similar elements may be represented by the same or similar patterns or symbols. It should be understood that unless explicitly specified, the patterns or symbols in the drawings are only used to distinguish elements, not to limit the shapes of the elements. In the drawings of this application.

DETAILED DESCRIPTION

Figure 1:
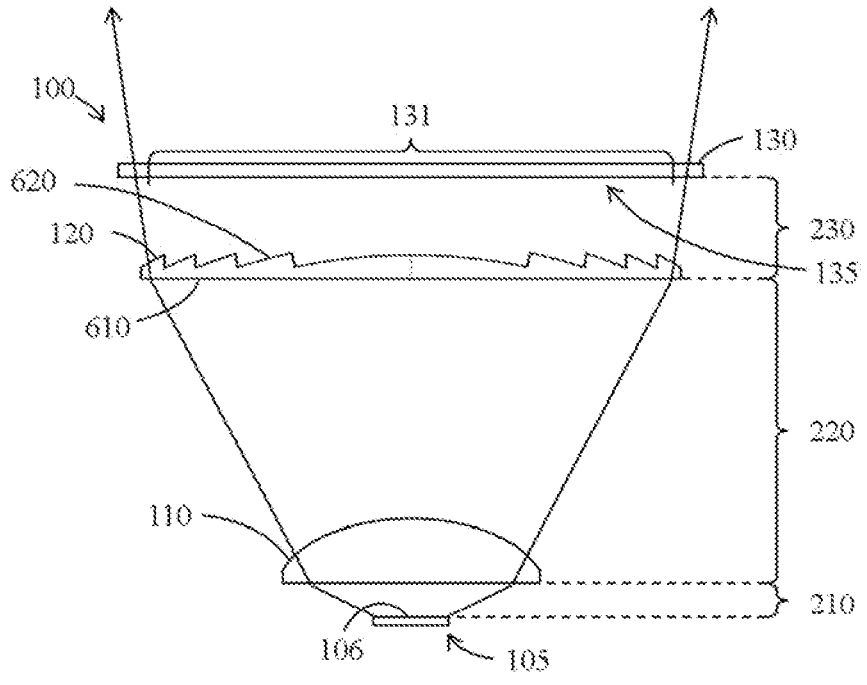
FIG. 1 schematically shows a cross-sectional view of a display module according to an embodiment of the present application.

The technical solutions in the embodiments of the present application will be described below with reference to the drawings in the embodiments of the present application. Apparently, the described embodiments are only some of the embodiments of the present application, rather than all the embodiments. Based on the described embodiments, all other embodiments obtained by the person of ordinary skill in the art without making creative efforts belong to the protection scope of the present application.

In projection display, it is desirable that the illuminance distribution of the light beam irradiating the display panel is uniform and has a high degree of collimation. A single lens cannot adjust the light beam to have a uniform illuminance distribution and to be collimated, and a secondary optical processing is required to achieve the ideal illuminance distribution and collimation requirements. For example, different optical processing effects are achieved through the two lenses, so as to map the light emitted by the light emitting area with the first size onto the display panel with the second size. Among the two lenses, one lens (also called the first lens) acts as a converging lens, which is used to converge the light emitted by the light source with an effective divergence half angle of a into a light with an effective divergence half angle of β, so that the light irradiated on the display panel falls within the display area as much as possible, which is beneficial for obtaining higher optical efficiency. The other lens (also called the second lens) acts as a collimator, which collimate the converged light into a ray with the effective divergence half angle of γ. In different fields, the requirements for effective divergence half angle γ of the collimated light beams are different, but in general, the range of γ is normally relatively small. The respective topography of the two lenses (such as the curve shape of the lens surface) is crucial for the above-mentioned converging and collimating effects.

However, the inventor found that, in the related art, these two lenses cannot bring satisfactory optical effects. One reason is that, in the related technologies, projectors with display panels of different sizes may share lenses without making specific adjustments to the size and position of each device in the projectors, resulting in low optical efficiency. Another reason is that even if one wants to design lenses individually for different projectors, there are some problems with the current lens design methods. In the related art, one method of designing a lens is the method of Trial and Error. In the method of Trial and Error first establishes the initial structure of the lens based on the known luminous characteristics of the light source, and then uses optical software to simulate in order to obtain the preliminary optical effect of the initial structure. Then, through the optimization of algorithm and modules, the surface shape of the lens is continuously optimized to obtain the best results. In the method of Trial and Error, the quality of the optimization result is often related to the number of iterations. This method has relatively high requirements on the initial structure, and requires a large amount of work to complete. Another method to designing lenses is the numerical method. The numerical method specifically comprises partial differential equation method, multi-surface design method and meshing method. The partial differential equation method establishes a partial differential equation system mainly based on the differential relationship between the incident light vector, the outgoing light vector and the normal vector of the free-form surface of the light source, combined with Snell's law. Then, the numerical value of the free-form surface of the lens is obtained by numerical solution. However, this method is suitable for small-volume light sources. The light source is usually regarded as a point light source during calculation, and the shape of the lens is used to map the point light source into a light spot on the display panel. However, the light source of the projector generally adopts the chip on board (COB) surface light source, which has a large light-emitting surface, and it is a difficult process to collimate it into a light spot having the size of the display area of the display panel. The partial differential equation method has a large loss of the luminous flux of the light source. The multi-surface design method establishes the optical path relationship between two sets of incident wavefronts and outgoing wavefronts according to the luminous characteristics of the light source and the specific illumination distribution. By solving the optical path relationship, the discrete surface data of the free-form surface can be obtained. However, this method cannot solve the problem of asymmetric lighting, because the equations constructed by this method are very complicated and have high difficulty in solving. The meshing method is a method derived from the partial differential equation method. The difference is that the meshing method divides the light source and the target surface into n equal parts, and then calculates the initial structure through the partial differential equation method. Then, it iterates through the computing software to obtain the scatter data and vectors of the free-form surface. This method requires complex and difficult calculation and iterations, and it optimizes a certain point of the light source to a certain point of the target without considering the influence of other lights, and the result deviation is relatively large. In short, the above methods of designing lenses are mainly for point light sources rather than surface light sources, and calculate the value of the local surface shape through partial differential equations. The limitations of these methods are relatively large, and the calculation is complicated, and even the solution cannot be solved, and the shape of the obtained lens cannot achieve the desired optical effect.

Figure 2:
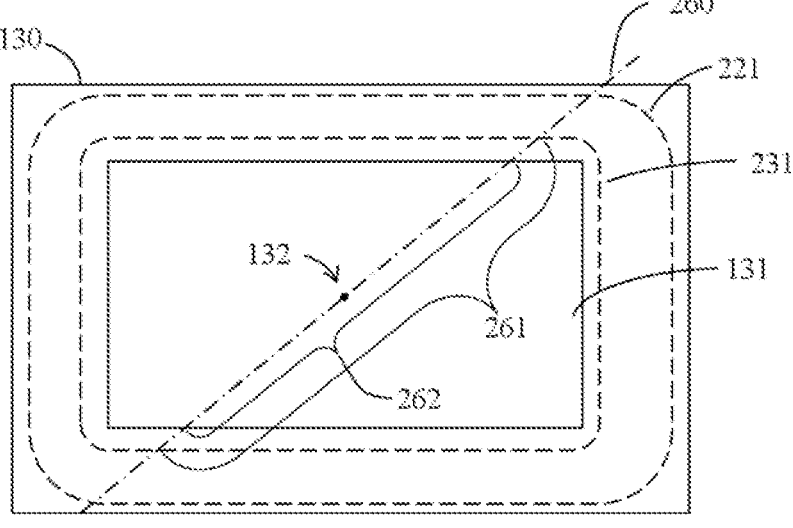
FIG. 2 schematically shows an illumination effect diagram of a display module according to an embodiment of the present application.

According to an aspect of the present application, a display module is provided. FIG. 1 schematically shows a cross-sectional view of a display module according to an embodiment of the present application. FIG. 2 schematically shows an illumination effect diagram of a display panel of a display module according to an embodiment of the present application. As shown in FIG. 1, the display module 100 comprises a light source 105, a first lens 110, a second lens 120, and a display panel 130. The light source 105 comprises a light emitting area 106, and the display panel 130 comprises a display area 131. The light emitting area 106 is a portion of the surface of the light source 105 from which light is emitted. In a more specific embodiment, the light source 105 comprises an LED light source. The type of the surface of the light source 105 can be a flat plane or a curved surface, such as a rotationally symmetrical curved surface or an axisymmetric curved surface. The light source 105 is configured to emit the first light beam 210 to the first lens 110 through the light emitting area 106. The first lens 110 is configured to receive the first light beam 210, refract the first light beam 210 into the second light beam 220, and emit the second light beam 220 to the second lens 120. The second lens 120 is configured to receive the second light beam 220, refract the second light beam 220 into the third light beam 230, and emit the third light beam 230 to the display panel 130.

It should be noted that at least part of the light received by the light-incident surface 135 of the display panel 130 is contributed by the third light beam 230. In some embodiments, most or all of the light received by the light-incident surface 135 of the display panel 130 is contributed by the third light beam 230.

The plane where the light-incident surface 135 of the display panel 130 is located comprises the first irradiation area 221, and the first irradiation area 221 is the area where the light emitted by the light source 105 is irradiated on the plane where the light-incident surface of the display panel 130 is located (See FIG. 2). In some embodiments, the first irradiation area 221 is located within the outer boundary of the display panel, as shown in FIG. 2. In some other embodiments, the first irradiation area 221 may also be located outside the outer boundary of the display panel, that is, the first irradiation area is located on the plane where the display panel is located. The first irradiation area 221 comprises the first effective irradiation area 231 which is continuously distributed. The first effective irradiation area 231 comprises a strongest illumination position, such as the central area of the first effective irradiation area. The illumination intensity on the outer contour of the first effective irradiation area 231 is I % of the illumination intensity of the strongest illumination position. That is, the first effective irradiation area 231 is a part of the first irradiation area 221 where the illumination intensity meets specific require- ments. In some embodiments, the range of I is I≥45. Generally speaking, the illumination intensity of the illumi- nated irradiation area decreases from the strongest illumi- nation position (such as the center position) to the surround- ing areas. Therefore, the outer contour of the first effective irradiation area 231 is generally the position where the illumination intensity of the first effective irradiation area 231 is the weakest. When I≥45, the illuminance at the weakest position of the illumination intensity of the first effective irradiation area 231 can reach 45% of the strongest illuminance. In this situation, the overall illuminance of the first effective irradiation area 231 is relatively high, and the brightness difference between the center and the outer contour is relatively small. This is beneficial for the display module to be used in application scenarios such as projec- tors, for example, to ensure the brightness uniformity of the projected images of the projector. In a more specific embodi- ment, the range of I is 45≤I≤70, for example, I=50. Gener- ally speaking, if the illuminance at the weakest position of the illumination intensity can reach 70% of the strongest illuminance, the brightness uniformity of the display screen is already at a relatively high level. From the perspective of cost saving, the general design of I is less than or equals to 70.

The first lens 110 and the second lens 120 are configured such that the first effective irradiation area 231 covers the display area 131, and on the plane where the light-incident surface 135 of the display panel 130 is located, any straight line passing through the center point 132 of the display area (such as the straight line 260 in FIG. 2) is intercepted by the outer contour of the first effective irradiation area 231 as the first line segment 261, and is intercepted by the outer contour of the display area 131 as the second line segment 262, wherein a length ratio of the first line segment 261 to the second line segment 262 is in a range of 1-1.3.

By the above configuration on the first lens 110 and the second lens 120, the effective part of the first irradiation area 221 formed by the light emitted by the light source 105 on the display panel 130 (that is, the part where the illumination intensity reaches I % of the maximum illumination intensity, that is, the first effective irradiation area 231) covers the display area 131. In this way, firstly, it can be ensured that the image displayed in the display area 131 can be com- pletely and substantially projected. At the same time, since the length ratio of the first line segment 261 to the second line segment 262 is in the range of 1-1.3, the outline of the first effective irradiation area 231 and the outer contour of the display area 131 have the very similar shape and size. This means that the display module will have higher bright- ness and higher optical efficiency. When the length ratio of the first line segment 261 to the second line segment 262 is less than 1, the display area cannot be completely effectively illuminated, resulting in that the brightness uniformity in the display area does not meet expectations. When the length ratio of the first line segment 261 to the second line segment 262 is greater than 1.3, more light emitted by the light source is located outside the display area, and the light emitted by the light source is not effectively utilized. Preferably, the length ratio of the first line segment 261 to the second line segment 262 may be between 1.1 and 1.3, such as 1.1, 1.13, 1.15, 1.17, 1.19, 1.2, 1.22, 1.24, 1.26, 1.28, 1.29, 1.3. The ratio of the first line segment 261 to the second line segment 262 in this range can leave a certain distance between the outer contour of the first effective irradiation area 231 and the display area 131, providing enough design margins while ensuring the utilization efficiency of the light emitted by the light source. In some embodiments, the normal of the display area 131 and the optical axis of the second lens 120 are parallel. In some embodiments, there may be a certain angle between the normal of the display area 131 and the optical axis of the second lens 120, for example, within a range greater than 0° and less than or equal to 10°. The length ratio of the first line segment 261 to the second line segment 262 between 1.1 and 1.3 can ensure that when there is a certain angle between the normal of the display area 131 and the optical axis of the second lens 120, the outer contour of the first effective irradiation area 231 still surrounds the display area 131, ensuring the display effect. The angle between the normal of the display area 131 and the optical axis of the second lens 120 may be 5°, for example.

In some embodiments, on the plane where the light-incident surface of the display panel is located, the differ- ence between the length of the first line segment 261 and the length of the second line segment 262 is within the range of 0-30 mm. When the length difference is within this range, it can be considered that the shapes and sizes of the outline of the first effective irradiation area 231 and the outer contour of the display area 131 are relatively close, and the light emitted by the light source is effectively utilized. In some embodiments, the first line segment 261 can be 15 mm-30 mm longer than the second line segment 262, for example, the first line segment 261 can be 15 mm, 16 mm, 19 mm, 20 mm, 22 mm, 25 mm, 27 mm, 29 mm, 30 mm longer than the second line segment 262. The length difference between the first line segment 261 and the second line segment 262 within this range can leave a certain distance between the outer contour of the first effective irradiation area 231 and the display area 131, so as to ensure the utilization efficiency of the light emitted by the light source, while providing a sufficient design margin. In some embodiments, the normal of the display area 131 and the optical axis of the second lens 120 are parallel. In some embodiments, there may be a certain angle between the normal of the display area 131 and the optical axis of the second lens 120, for example, within a range greater than 0° and less than or equal to 10°, and the ratio of the first line segment to the second line segment is in the range of 1-1.3, which can ensure that when there is a certain angle between the normal of the display area 131 and the optical axis of the second lens 120, the outer contour of the first effective irradiation area 231 still surrounds the display area 131, ensuring the display effect. The angle between the normal of the display area 131 and the optical axis of the second lens 120 may be 5°, for example.

Figure 3:
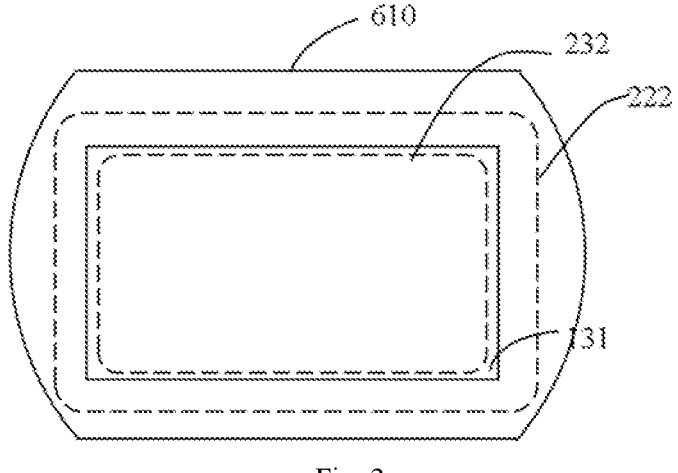
FIG. 3 schematically shows an illumination effect diagram of a display module according to an embodiment of the present application.

FIG. 3 schematically shows the illumination effect dia- gram of the second lens of the display module according to an embodiment of the present application. In some embodi- ments, the second lens 120 comprises the second light- incident surface 610 and the second light-exit surface 620. The second light beam 220 irradiates the second light- incident surface 610 of the second lens 120, enters the second lens 120 from the second light-incident surface 610, and then exits the second lens 120 from the second light-exit surface 620 of the second lens 120. In some embodiments, the second lens 120 may be a Fresnel lens, one surface of which is a flat plane, and the other surface is engraved with a plurality of concentric circles, wherein the flat plane may serve as the second light-incident surface 610 of the second lens 120, and the surface engraved with the plurality of concentric circles may serve as the second light-exit surface 620 of the second lens 120.

The plane where the second light-incident surface 610 is located comprises the second irradiation area 222. The second irradiation area 222 comprises the second effective irradiation area 232. The second effective irradiation area 232 is mapped as the first effective irradiation area 231 by the second lens on the plane where the display panel is located. That is, the second effective irradiation area 232 can be determined by optically tracing the rays irradiated to the first effective display area 231. The second lens 220 is configured such that the area of the second effective irradiation area 232 is 90%-110% of the area of the display area 131. As shown in FIG. 3, the area of the second effective irradiation area 232 is close to the area of the display area 131, so that after collimation by the second lens 120, the area of the first effective irradiation area 231 will also be close to that of the display area 131, therefore, the display module 100 has relatively high optical efficiency, and the light incident on the display area 131 has relatively good collimation, and when the display module is used in a projector, it can meet the requirements of optical design. In a specific embodiment, the outer contour of the second effective irradiation area 232 is located within the outline of the second light-incident surface 610 of the second lens 120; the light in the second effective irradiation area 232, after being refracted by the second lens 120, falls on the plane where the display panel is located, and these lights form the first effective irradiation area.

In addition, since the area of the second effective irradiation area 232 is close to the area of the display area 131, when selecting the second lens 120, it can be selected by referring to the size of the display area 131, for example, so that the size of the second lens 120 is close to, or even equal to that of the display area 131. The size of the second lens 120 is close to the size of the display area 131, for example, it can be considered that the second lens 120 can be designed by enlarging or reducing the display area 131 in proportion, and the area of the second lens 120 is in the range of 90%-120% of the area of the display area 131, for example, the area of the second lens 120 is 90%, 95%, 100%, 105%, or 110% of the area of the display area 131.

It should be noted that at least part of the light received by the second light-incident surface 610 is contributed by the second light beam 220. In some embodiments, most or all of the light received by the second light-incident surface 610 is contributed by the second light beam 220.

It should be understood that, a better collimation effect of the second lens 120 means that the effective divergence half angle γ of the third light beam 230 is smaller. However, no matter how small the γ angle is, it cannot reach 0°, which can be explained based on the theory of étendue. As shown in equation (1), the étendue U is the integral of the beam area and beam angle when the beam passes through the optical system.

$$U = n^2 \int \int \cos\theta dAd\Omega \qquad (1)$$

wherein, dA is the area element, θ is the angle between the area element and the light emitted by the light source, n is the refractive index, U is the étendue, and Ω is the beam solid angle. According to this theory, there is neither a point light source, that is, a light source with an area of 0, nor a fully collimated light source, that is, a light source with a beam angle of 0°. Even for laser light sources, there is a small beam angle. Therefore, the area of the first effective irradiation area 231 on the plane where the light-incident surface of the display panel is located may be larger than the area of the second effective irradiation area 232 on the second lens. However, as mentioned above, the shapes and sizes of the outer contour of the first effective irradiation area 231 and the outer contour of the display area 131 are close. On this basis, it is further required that the area of the second effective irradiation area 232 is close to the area of the display area 131, so the area of the first effective irradiation area 231 will also be close to the area of the second effective irradiation area 232, indicating that the second lens 120 has good collimation performance.

In a specific embodiment, the number of the sides of the outer contour of the first effective irradiation area 231 is the same as the number of the sides of the outer contour of the display area 131. For example, the first effective irradiation area 231 and the display area 131 are both rectangular.

In a specific embodiment, the optical axis of the second lens is parallel to the normal of the display panel, and each side of the outer contour of the first effective irradiation area 231 is parallel to a corresponding side of the display area 131. For example, the outer contour of the first effective irradiation area 231 is set to envelope the display area 131.

In a specific embodiment, when the optical axis of the second lens is not parallel to the normal of the display panel (for example, there is an angle of) 5°, the outer contour of the first effective irradiation area 231 may be a trapezoid, the outer contour of the display area 131 is a rectangle, due to oblique illumination, the long and short sides of the trapezoid are parallel to the two sides of the display area 131 respectively, the legs of the trapezoid have angle with the other two sides of the outer contour of the display area, the two angles are equal in degree.

Figure 4:
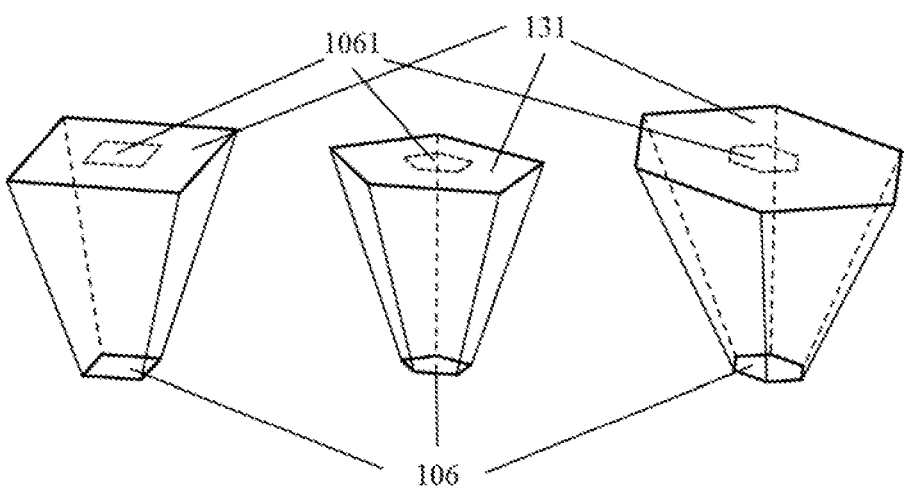
FIG. 4 schematically shows the corresponding relationship between the shape of the light emitting area of the light source and the shape of the display area.

In order to make the lighting device 100 have higher optical efficiency, the shape of the lens and the light source can be selected according to the shape of the display area 131. In some embodiments, the outer contour of the light emitting area 106 and the outer contour of the display area 131 have the same shape. FIG. 4 schematically shows the corresponding relationship between the shape of the outer contour of the light emitting area and the shape of the outer contour of the display area. For example, when the shape of the outer contour of the display area 131 is a rectangle, the light emitting area 106 of the light source 105 should also have a shape of rectangle when selecting the light source. Similarly, if the shape of the outer contour of the display area 131 is other polygons, the light source should also have a corresponding shape. In some embodiments, the number of sides of the outer contour of the light emitting area 106 is the same as the number of sides of the display area 131, and the orthographic projections of each side of the outer contour of the light emitting area 106 on the display panel 130 are respectively parallel to a corresponding side of the display area 131. For example, as shown in FIG. 4, taking the rectangular display area 131 and light emitting area 106 as an example, the orthographic projection 1061 of the light emitting area 106 on the display panel is also a rectangle, and each side of the rectangular orthographic projection is parallel with the corresponding side of the display area 131. For example, the long side of the orthographic projection 1061 is parallel to the long side of the display area 131, and the short side of the orthographic projection 1061 is parallel to the short side of the display area 131. Further preferably, the size ratio of the outer contour of the light emitting area 106 is the same as the size ratio of the outer contour of the display area; for example, the outer contour of the light emitting area 106 is a rectangle with an aspect ratio of 3:2, the outer contour of the display area is also a rectangle with an aspect ratio of 3:2.

Figure 5:
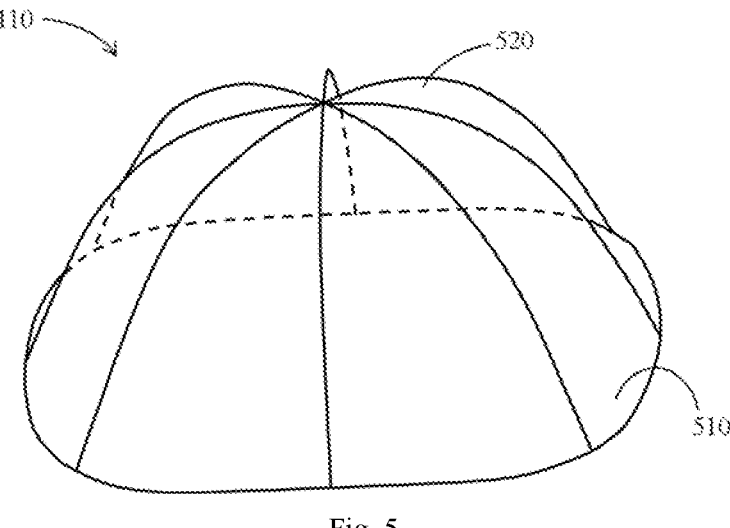
FIG. 5 schematically shows a perspective view of a first lens of a display module according to an embodiment of the present application.

In some embodiments, the first lens 110 may be a plano-convex lens. FIG. 5 schematically shows a perspective view of the first lens of the display module according to an embodiment of the present application. As shown in FIG. 5, the first lens comprises the first light-incident surface 510 and the first light-exit surface 520. The first light-incident surface 510 is configured to receive the first light beam. The first light-exit surface 520 is configured to emit the second light beam to the second lens 120. For example, the first light-incident surface 510 is a flat plane, and the first light-exit surface 520 is a curved surface. As shown in FIG. 5, the first light-incident surface 510 and the first light-exit surface 520 are stitched to form the first lens 110. The first light-exit surface 520 can be constructed by stitching some special curve into a surface. Therefore, the curved surface shape of the first light-exit surface 520 can be described by the shape of some special curves on it. FIG. 5 is also an envelope plot of these curves. Each of these curves is described below.

Figure 6:
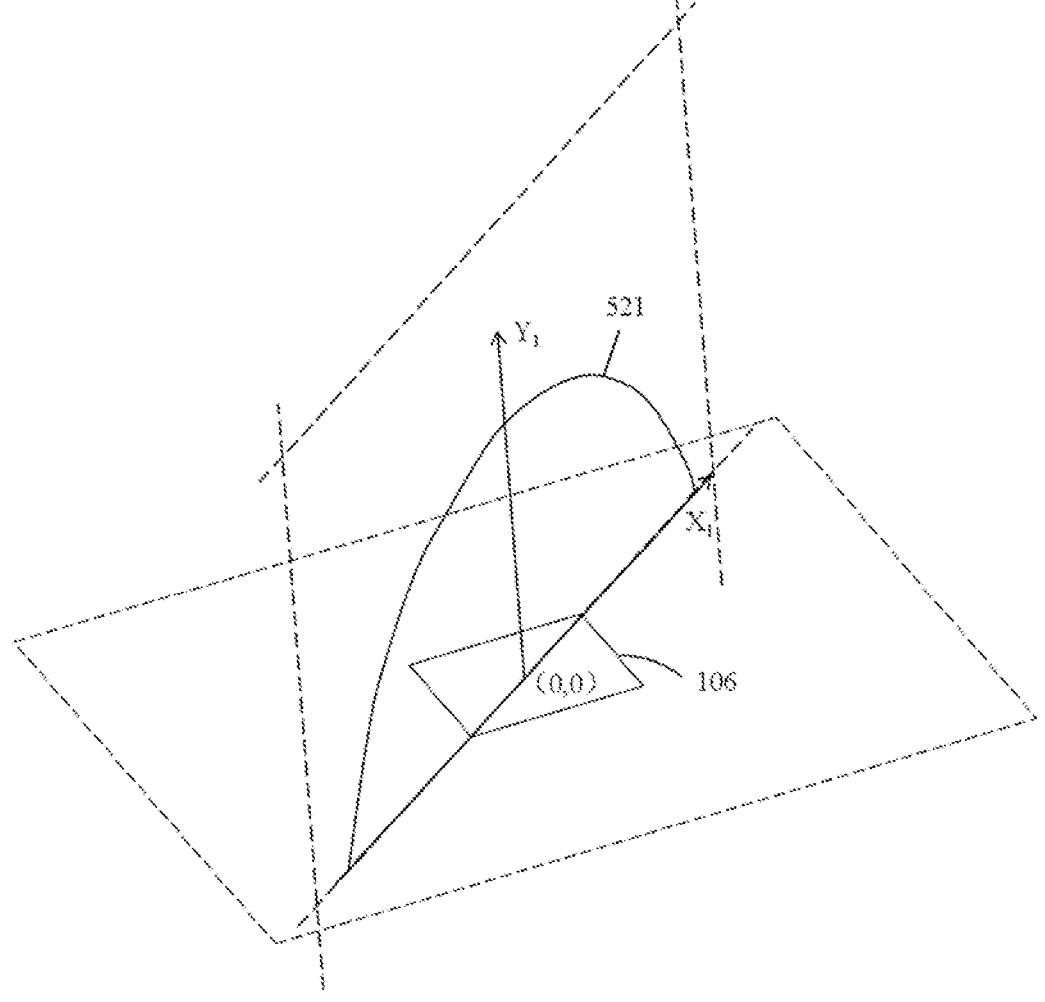
FIG. 6 schematically shows a first one of the special curves for stitching into the first light-exit surface.

FIG. 6 schematically shows one of the special curves used for stitching into the first light-exit surface. The first coordinate system $(X_1OY_1)$ is defined with the center point of the light emitting area 106 being the origin, the straight line where a diagonal line of the light emitting area 106 is located being the x-axis, and an central normal of the light emitting area being the y-axis. It should be noted that the center point of the light emitting area 106 should be understood as the geometric center of the plane area circled by the outer contour of the light emitting area. For example, the surface type of the light emitting area 106 is a curved surface (e.g., the interior of the light emitting area 106 protrudes toward the first lens 110 or away from the first lens 110), in this situation, the center point of the light emitting area 106 is the geometric center of the plane area circled by the outer contour of the light emitting area, that is, the geometric center is not on the surface of the light emitting area 106.

In a specific embodiment, the outer contour of the light emitting area 106 is a rectangle. It should be noted that the rectangle may comprise a rounded rectangle, that is, at least one of the four corners of the rectangle is rounded.

Figure 7:
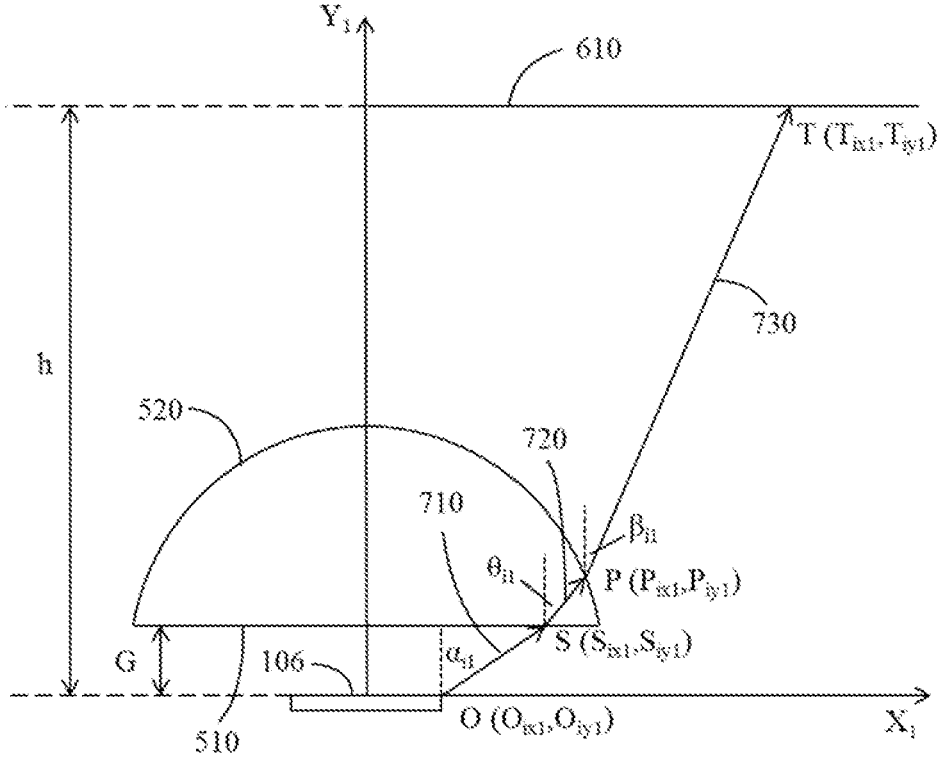
FIG. 7 schematically shows the light path diagram of the rays emitted by the light source in the first coordinate system.

FIG. 7 schematically shows the light path diagram of the rays emitted by the light source in the first coordinate system. The light source in FIG. 7 is a flat light source. As shown in FIG. 7, in the first coordinate system $(X_1OY_1)$, the first ray 710 emitted by the light source 105 to the first lens 110 is refracted by the first light-incident surface 510 into the second ray 720. The second ray 720 is refracted by the first light-exit surface 520 into the third ray 730. When determining the above three rays, the light emitting area 106 of the light source and the first light-incident surface 510 of the first lens 110 are divided into n parts. Each part of the light emitting area 106 is in one-to-one correspondence with a part of the first light-incident surface 510, ensuring complete mapping of light. The effective light-exit area of the first light-exit surface 520 is intercepted into the first intercepted line 521 by the first coordinate system.

In some embodiments, for the light source, the light intensity of the light emitted at a large angle is often smaller than that of the light emitted at a small angle, so the light emitted at an excessively large angle cannot be effectively used. For example, if it is considered that only the light emitted by the light emitting area 106 whose light intensity reaches J % of the maximum light intensity can meet the display requirements, and the effective divergence half angle α of the first light beam corresponds to J % of the maximum intensity of light, then the area defined by the light within the effective divergence half angle α emitted by the light emitting area 106 on the first light-exit surface 520 after entering the first lens 110 is the effective light-exit area of the first light-exit surface 520. That is, the effective light-exit area of the first light-exit surface 520 can be obtained by optically tracing the light emitted from the light emitting area 106 that is greater than or equal to J % of the maximum light intensity. Specifically, J≥45. Optionally, the range of J may be 45-70, which can reduce the process difficulty and cost while improve the uniformity of the picture. For example, J=50.

In a specific embodiment, the value of J is equal or approximately equal to the value of I.

In some embodiments, the effective light-exit area of the first light-exit surface 520 can also be defined by the effective divergence half angle α, that is, it can be considered that, among the light emitted by the light emitting area 106, only the area on the first light-exit surface 520 irradiated by the light whose divergence half angle is less than or equal to the effective divergence half angle α is the effective light-exit area of the first light-exit surface 520. That is, the effective light-exit area of the first light-exit surface 520 can be obtained by optically tracing the light within the effective divergence half angle α. Specifically, α≤65°. Optionally, the range of α may be 40°-65°, which can reduce the process difficulty and cost while showing the uniformity of the picture. Effectively, for example, α=60°.

Figure 13:
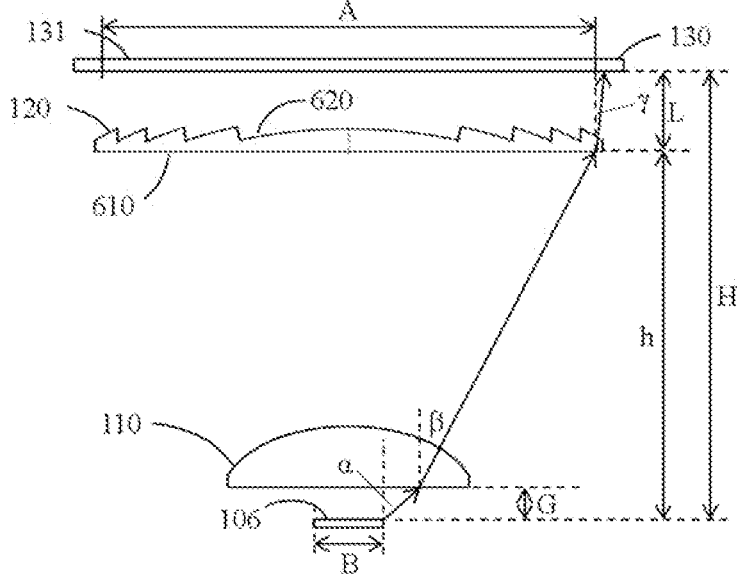
FIG. 13 schematically shows an optical path diagram of a display module according to an embodiment of the present application.

Further, as shown in FIG. 13, for two points on the outline of the light emitting area 106 which intersect with a diagonal line of the light emitting area 106, the outwardly diffused light emitted by the effective divergence half angle α of the first light beam 210 is refracted at the first lens 110 at an angle of β, and refracted at the second lens 120 at an angle of γ, and then projected onto the plane where the display panel 131 is located. Specifically, the range of the β angle may be: 25°≤β≤45°; the range of the γ angle may be: 0°≤γ≤10°.

Further, as shown in FIG. 13, G is the distance between the light emitting area 106 and the first lens 110, and h is the distance between the second light-incident surface 510 and the light emitting area 106.

When the coordinates of α, β, γ, h, G, and the outer contour of the light emitting area 106 are determined, the shape of the first intercepted line 521 can be determined.

Any point $(x_1, y_1)$ on the first intercepted line 521 satisfies the following equation:

$$\begin{cases} x_1 = \dfrac{h - G - T_{ix1}\sin\beta_{i1} + S_{ix1}\sin\theta_{i1}}{\sin\theta_{i1} - \sin\beta_{i1}} + M \\ y_1 = \left( \dfrac{h - G - T_{ix1}\sin\beta_{i1} + S_{ix1}\sin\theta_{i1}}{\sin\theta_{i1} - \sin\beta_{i1}} - S_{ix1} \right)\sin\theta_{i1} + G + N \end{cases} \tag{2}$$

wherein, h is the distance between the second light-incident surface 610 of the second lens 120 and the light emitting area 106 (as shown in FIG. 13). G is the distance between the light emitting area 106 and the first light-incident surface 510. The second lens 120 comprises the second light-incident surface 610. The light source emits light from point O $(O_{ix1}, O_0)$ of light emitting area 106, irradiates to point S ($S_{ix1}$, $S_{iy1}$) on the first light-incident surface 510 of the first lens 110, and enters into the first lens 110 from point S. The light then exits the first lens 110 from point P ($P_{ix1}$, $P_{iy1}$) on the first light-exit surface 520, and irradiates the point T ($T_{ix1}$, $T_{iy1}$) on the second light-incident surface 610 of the second lens 120. Therefore, $S_{ix1}$ is the distance from the intersection of the first ray 710 and the first light-incident surface 510 to the central normal of the light emitting area 106. $T_{ix1}$ is the distance from the intersection of the third ray 730 and the second light-incident surface 610 to the central normal of the light emitting area 106. In order to ensure the convenience during processing and installation, the first light-incident surface 510 of the first lens 110 is a flat plane, so the intercepted line of the first light-incident surface 510 on the first coordinate system ($X_1OY_1$) is a straight line $y_1=G$ which is parallel to the light emitting area 106. Therefore, $S_{iy1}=G$. Similarly, the second light-incident surface 610 of the second lens 120 is also a flat plane, so $T_{iy1}=h$. The first ray 710, the second ray 720, and the third ray 730 respectively form angles $\alpha_{i1}$, $\theta_{i1}$, and $\beta_{i1}$ with the y-axis (i.e., the central normal of the light emitting area 106). That is, $\beta_{i1}$ is the angle between the third ray 730 and the central normal of the light emitting area 106, $\theta_{i1}$ is the angle between the second ray 720 and the central normal of the light emitting area 106. M and N are constants, wherein $0 \leq M \leq 4$, $0 \leq N \leq 4$. In a more specific embodiment, M is approximately equal to 1 and N is approximately equal to 1. In some embodiments, M and N depend on the lens processing tolerance, surface normalization error, and surface fitting error, and M and N can be used to regulate the position of the vertices of the first intercepted line. When M is greater than 4 or when N is greater than 4, the resulting first intercepted line may be unusable. In the ideal case, M=0 and N=0. It should be noted that when the surface shape of the light emitting area 106 is a curved surface, h is the distance between the geometric center of the flat plane area circled by the outer contour of the light emitting area 106 and the second light-incident surface 610 of the second lens 120. In addition, when the surface shape of the light emitting area 106 is a curved surface, G is the distance between the geometric center of the flat plane area circled by the outer contour of the light emitting area 106 and the first light-incident surface 510 of the first lens 110.

The principle of the equation of the first intercepted line 521 is briefly introduced below. First, the equation of a line for any ray passing through the effective light-exit area of the first lens is computed. According to FIG. 7, it can be concluded that the general equation of the OS ray (i.e., the first ray 710) in the $X_1OY_1$ Cartesian coordinate system is:

$$y_1 = \tan(90° - \alpha_{i_1})x_1 - 0_{ix_1} \tan(90° - \alpha_{i_1}) \tag{3}$$

The general equation of the SP ray (i.e., the second ray 720) in the $X_1OY_1$ Cartesian coordinate system is:

$$y_1 = \tan(90° - \theta_{i_1})x_1 + [G - \tan(90° - \theta_{i1}) \cdot S_{ix1}] \tag{4}$$

The general equation of the PT ray (i.e., the third ray 730) in the $X_1OY_1$ Cartesian coordinate system is:

$$y_1 = \tan(90° - \beta_{i_1})x_1 + [T_{iy1} - \tan(90° - \beta_{i1}) \cdot T_{ix1}] \tag{5}$$

According to Snell's law (i.e., the law of refraction), the relationship between the angles $\alpha_{i1}$ and $\theta_{i1}$ can be obtained as follow.

$$\sin\alpha_{i1} \cdot n_1 = \sin\theta_{i1} \cdot n_2 \tag{6}$$

In equation (6), $n_1$ is the refractive index of the medium outside the first lens 110 (for example, air), and $n_2$ is the refractive index of the material of the first lens 110.

Figure 8:
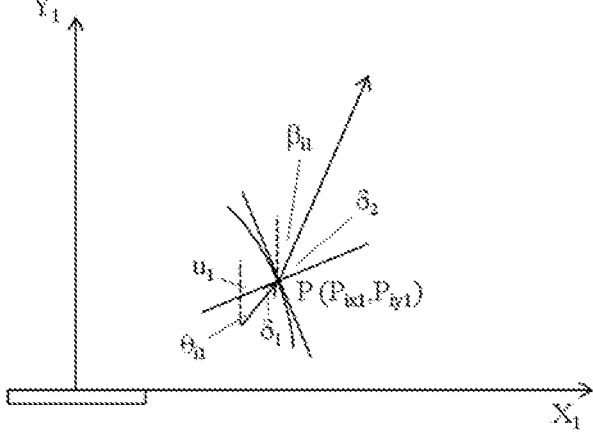
FIG. 8 schematically shows the tangent of the first light-exit surface of the first lens.

Next, the tangent equation for point P is computed. FIG. 8 schematically shows the tangent of the first light-exit surface of the first lens. According to FIG. 8, the tangent equation of point P is:

$$y_1 = \tan(-u_1) \cdot x_1 + P_{iy1} - P_{ix1} \cdot \tan(-u_1) \tag{7}$$

wherein $$u_{i_1} = \delta_{i_1} + \theta_{i_1} \tag{8}$$

$$u_{i1} = \beta_{i1} + \delta_{i2} \tag{9}$$

$$n_1 \sin\delta_{i_1} = n_2 \sin\delta_{i_2} \tag{10}$$

The point set on the first intercepted line 521 can be obtained by performing multiple iterations on the above equations. By fitting the point set, the parameters of the first intercepted line 521 can be obtained, and the final equation of the first intercepted line 521 is the equation represented by the aforementioned equation (2). The intercepted line of the first light-exit surface 520 on the coordinate system of another diagonal line of the light emitting area 106 can be obtained through a similar derivation or a mirroring relationship, which will not be repeated here.

Figure 9:
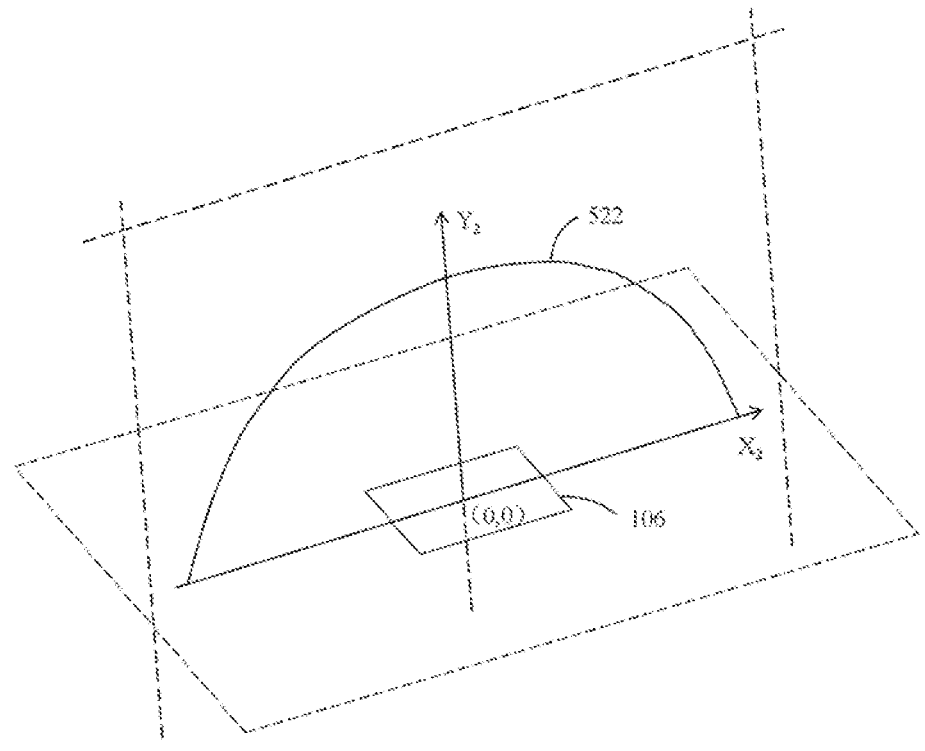
FIG. 9 schematically shows a second one of the special curves for stitching into the first light-exit surface.

FIG. 9 schematically shows a second one of the special curves for stitching into the first light-exit surface. A second coordinate system ($X_2OY_2$) is defined with the center point of the light emitting area 106 being the origin, the extension direction of the long side of the outer contour of light emitting area 106 being the direction of the x-axis, and the central normal of the light emitting area being the y-axis. Same as above, the center point of the light emitting area 106 should be understood as the geometric center of the flat plane area circled by the outer contour of the light emitting area. The outer contour of the light emitting area 102 is, for example, a rectangle.

In the second coordinate system, the rays emitted by the light source will also obtain an optical path diagram similar to that shown in FIG. 7, which will not be repeated here. In the second coordinate system, the first ray emitted by the light source to the first lens 110 is refracted by the first light-incident surface 510 into the second ray. The second ray is refracted by the first light-exit surface 520 into the third ray. The effective light-exit area of the first light-exit surface 520 is intercepted into the second intercepted line

522 by the second coordinate system. The definition of the effective light-exit area of the first light-exit surface 520 is the same as the definition when describing one of the special curves.

Any point $(x_2, y_2)$ on the second intercepted line 522 satisfies the following equation:

$$\begin{cases} x_2 = \dfrac{h - G - T_{ix2}\sin\beta_{i2} + S_{ix2}\sin\theta_{i2}}{\sin\theta_{i2} - \sin\beta_{i2}} + P \\ y_2 = \left( \dfrac{h - G - T_{ix2}\sin\beta_{i2} + S_{ix2}\sin\theta_{i2}}{\sin\theta_{i2} - \sin\beta_{i2}} - S_{ix2} \right)\sin\theta_{i2} + G + Q \end{cases} \quad (11)$$

wherein, h is the distance between the second light-incident surface and the light emitting area, G is the distance between the light emitting area and the first light-incident surface, and $S_{ix2}$ is the distance from the intersection point of the first ray and the first light-incident surface to the central normal of the light emitting area, $T_{ix2}$ is the distance from the intersection point of the third ray and the second light-incident surface to the central normal of the light emitting area, $\beta_{i2}$ is the angle between the third ray and the central normal of the light emitting area, $\theta_{i2}$ is the angle between the second ray and the central normal of the light emitting area, P and Q are constants, wherein $0 \le P \le 3$, $0 \le Q \le 3$. In a more specific embodiment, P is approximately equal to 1 and Q is approximately equal to 1. In some embodiments, P and Q depend on lens processing tolerances, surface normalization errors, and surface fitting errors. P and Q can be used to control the position of the vertices of the second intercepted line. For a rectangular flat plane light source, the length of its long side is less than the length of its diagonal line. Therefore, the error of the second intercepted line is smaller than that of the first intercepted line, so the values of P and Q are for example smaller than the values of M and N. When P is greater than 3 or when Q is greater than 3, the resulting second intercepted line may be unusable.

Figure 10:
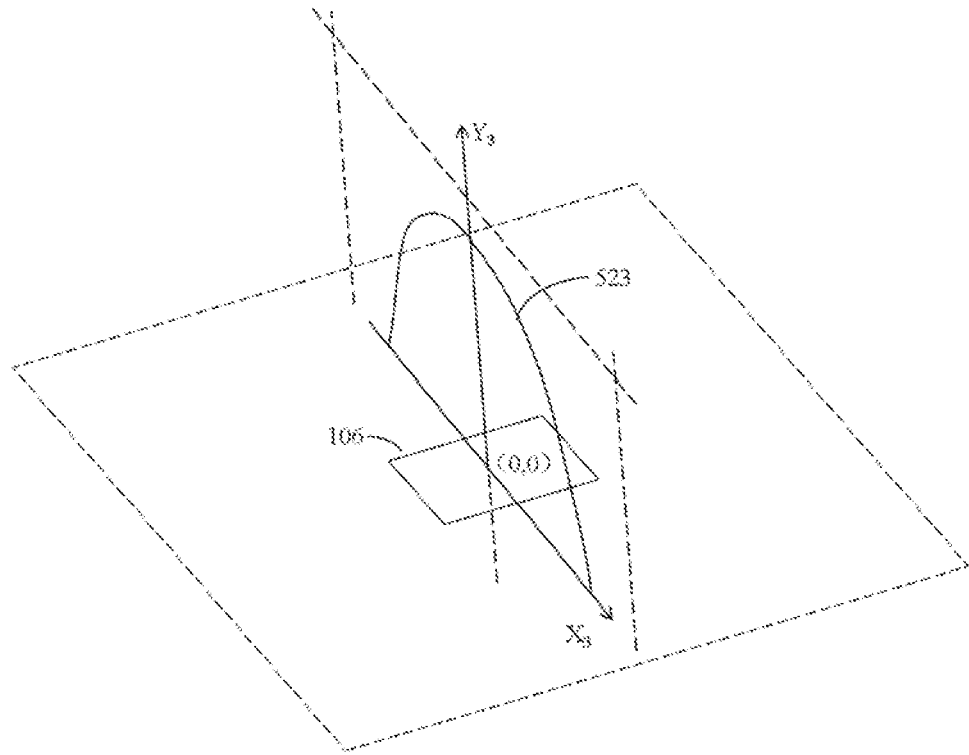
FIG. 10 schematically shows a third one of the special curves for stitching into the first light-exit surface.

FIG. 10 schematically shows the third one of the special curves for stitching into the first light-exit surface. A third coordinate system $(X_3OY_3)$ is defined with the center point of the light emitting area 106 being the origin, the extension direction of the short side of the outer contour of the light emitting area 106 being the direction of the x-axis, and the central normal of the light emitting area being the y-axis. The outer contour of the light emitting area 102 is a rectangle. Same as above, the center point of the light emitting area 106 should be understood as the geometric center of the flat plane area circled by the outer contour of the light emitting area.

In the third coordinate system, the rays emitted by the light source will also obtain an optical path diagram similar to that shown in FIG. 7, which will not be repeated here. In the third coordinate system, the first ray emitted by the light source to the first lens 110 is refracted by the first light-incident surface 510 into the second ray. The second ray is refracted by the first light-exit surface 520 into the third ray. The effective light-exit area of the first light-exit surface 520 is intercepted into the third intercepted line 523 by the third coordinate system. The definition of the effective light-exit area of the first light-exit surface 520 is the same as the definition when describing one of the special curves.

Any point $(x_3, y_3)$ on the third intercepted line 523 satisfies the following equation:

$$\begin{cases} x_3 = \dfrac{h - G - T_{ix3}\sin\beta_{i3} + S_{ix3}\sin\theta_{i3}}{\sin\theta_{i3} - \sin\beta_{i3}} + C \\ y_3 = \left( \dfrac{h - G - T_{ix3}\sin\beta_{i3} + S_{ix3}\sin\theta_{i3}}{\sin\theta_{i3} - \sin\beta_{i3}} - S_{ix3} \right)\sin\theta_{i3} + G + V \end{cases} \quad (12)$$

wherein, h is the distance between the second light-incident surface and the light emitting area, G is the distance between the light emitting area and the first light-incident surface, and $S_{ix3}$ is the distance from the intersection point of the first ray and the first light-incident surface to the central normal of the light emitting area, $T_{ix3}$ is the distance from the intersection point of the third ray and the second light-incident surface to the central normal of the light emitting area, $\beta_{i3}$ is the angle between the third ray and the central normal of the light emitting area, $\theta_{i3}$ is the angle between the second ray and the central normal of the light emitting area, C and V are constants, wherein $0 \le C \le 2$ and $0 \le V \le 2$. In a more specific embodiment, C is approximately equal to 1 and V is approximately equal to 1. In some embodiments, C and V depend on lens processing tolerances, surface normalization errors, and surface fitting errors. For a rectangular flat plane light source, the length of its short side is less than the length of its long side. Therefore, the error of the third intercepted line is smaller than that of the second intercepted line, so the values of C and V are generally smaller than the values of P and Q. When C is greater than 2 or when V is greater than 2, it may cause the resulting third intercepted line to be unusable.

In a more specific embodiment, the outer contour of the light emitting area 106 of the light source is a rectangle with a length of 13 mm and a width of 9 mm. The display area 131 of the display panel has a length of 101 mm and a width of 58 mm. The distance G between the light emitting area 106 and the first light-incident surface 510 is 2 mm. The distance L between the second light-incident surface 610 of the second lens and the liquid crystal panel is 8 mm. The distance h between the second light-incident surface and the light emitting area is 78 mm, and $\alpha = 60°$, $\beta = 35°$, and $\gamma = 10°$. In this case, equations (2), (11), and (12) can be used to obtain the respective point sets of the three intercepted lines. By fitting the point set of each intercepted line into a curve, and setting the highest power of the curves (for example, the highest power can be set to 3), the curve equation of the first intercepted line 521 can be obtained as:

$$y_1 = -0.0013x_1^3 - 0.0056x_1^2 - 0.0427x_1 + 21 \quad (13)$$

The curve equation for the second intercepted line 522 can be obtained as:

$$y_2 = 0.0029x_2^3 - 0.0484x_2^2 + 0.0357x_2 + 21 \quad (14)$$

The curve equation for the third intercepted line 523 can be obtained as:

$$y_3 = -0.0019x_3^3 + 0.0046x_3^2 - 0.0599x_3 + 21 \quad (15)$$

The specific value of the highest power depends on the calculation result of the point sets and the degree of the fit of the curves. For example, in the aforementioned equations (13)-(15), when the highest power is 3, the fitted curves fit the curves formed by the point sets more closely, so the highest power is set to be 3. Depending on the point sets, it is not excluded that the highest power of the curves could be other values, for example 4.

Figure 11:
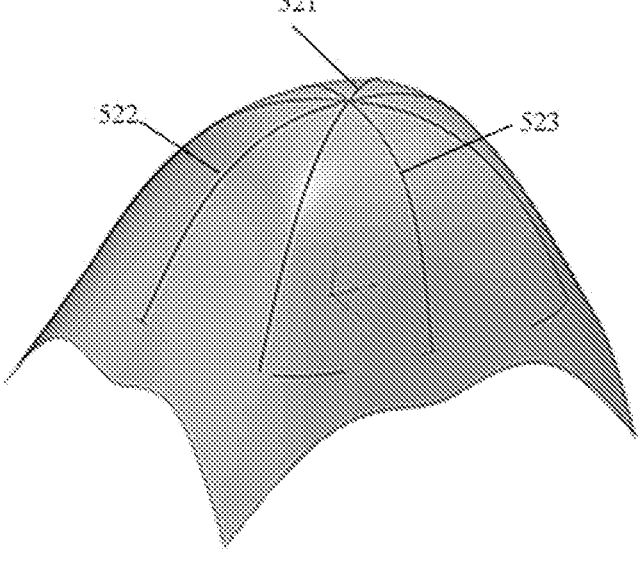
FIG. 11 schematically shows a surface fitting diagram of the first light-exit surface of the first lens of the display module according to an embodiment of the present application.

After obtaining the first intercepted line 521, the second intercepted line 522, the third intercepted line 523, and the mirroring intercepted line of the first intercepted line, the curved surface of the first light-exit surface 520 can be obtained through these four curves. For example, import the four curves into the processing software, and use the stitch surface command to stitch the curve envelope (such as FIG. 5) into a surface meshing graph. Since the above four curves are curves fitted by point sets, the vertices of these four curves may not intersect, resulting in an error in the curve envelope. In this case, it is required to fine-tune the curves by adjusting the values of M, N, P, Q, C, V, etc. to ensure that the vertices intersect. FIG. 11 schematically shows a surface fitting diagram of the first light-exit surface of the first lens of the display module according to an embodiment of the present application.

Figure 12:
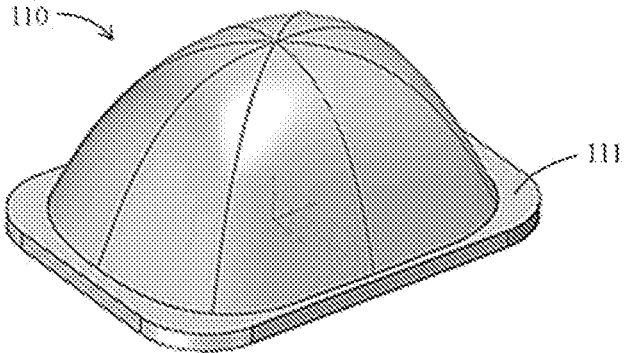
FIG. 12 schematically shows a structural diagram of the first lens after stitching.

After the surface fitting is completed, the position of the base 111 of the first lens 110 is designed according to the required shape and the value of the distance G between the light emitting area and the first light-incident surface. Then, the base and the fitting surface are stitched to obtain the structure of the first lens 110. FIG. 12 schematically shows the structural diagram of the first lens after stitching. The first lens fitted by the above equations has excellent optical properties, and can be used to make the shape and area of the outer contour of the first effective irradiation area 231 close to the shape and area of the outer contour of the display area 131, improving the optical efficiency of the display module 110.

In a specific embodiment, at least part of the light entering the display area 131 is formed by the light emitted by the light emitting area 106 passing through the first lens 110 and the second lens 120, and these light can defines a continuous distribution area in the first light-exit surface 520 by tracing, this area is defined as the effective projection area. It can be understood that the effective projection area is located in the effective light-exit area; the fourth intercepted line of the effective projection area intercepted by the first coordinate system is located in the first intercepted line 521, and any point on the fourth intercepted line satisfies the equation (2); the fifth intercepted line of the effective projection area intercepted by the second coordinate system is located in the second intercepted line 522, and any point on the fifth intercepted line satisfies the equation (11); the sixth intercepted line of the effective projection area intercepted by the third coordinate system is located in the third intercepted line 523, and any point on the sixth intercepted line satisfies the equation (12).

According to the foregoing equations (2), (11), and (12), it can be seen that the curved surface structure of the first lens 110 is related to the distance h between the second light-incident surface 610 and the light emitting area 106. The method of determining the distance h will be described below.

FIG. 13 schematically shows an optical path diagram of a display module according to an embodiment of the present application, and the schematic angle is along a diagonal line direction of the light emitting area 106, which is the same viewing angle as that in FIG. 7. Through the size and angle relationship in the figure, it can be obtained that the distance h between the second light-incident surface 610 and the light emitting area 106 satisfies the following equation:

$$h = \left( \frac{A}{2} - \frac{B}{2} - \frac{G}{\tan(90-\alpha)} - L\tan\gamma \right) \cdot \tan(90-\beta) + G + K \tag{16}$$

wherein, the outer contour of the display area 131 and the outer contour of the light emitting area 106 are both rectangles, A is the length of the diagonal line of the display area 131, B is the length of the diagonal line of the light emitting area 106, and G is the distance between the light emitting area 106 and the first lens 110; L is the distance between the center point of the light-incident surface of the display area 131 and the center point of the second light-incident surface 610 of the second lens 120. α is the effective divergence half angle of the first light beam 210. The light emitted as the first light beam 210 on the outline of the light emitting area 106 along the effective divergence half angle α is refracted at the angle β at the first lens 110, and refracted at the angle γ at the second lens 120. β is defined as the effective divergence half angle of the second light beam 220, and γ is defined as the effective divergence half angle of the third light beam 230. K is a constant, and the value of K is in the range of −5 mm to 5 mm. Preferably, the value of K is in the range of 0-2 mm. Further preferably, the value of K is in the range of 0-1 mm.

The effective divergence half angle β of the second light beam 220 reflects the convergence capability of the first lens 110. When designing the lens, the material and surface shape of the first lens 110 can be selected to determine β. Under the condition that the effective divergence half angle α of the first light beam remains unchanged, the stronger the convergence ability of the first lens 110 is, the smaller the effective divergence half angle β of the second light beam 220 will be.

The effective divergence half angle γ of the third light beam 230 reflects the convergence ability of the second lens 120. When designing the lens, the material and surface shape of the second lens 120 can be selected to determine γ. The stronger the convergence ability of the second lens 120 is, the smaller the effective divergence half angle γ of the third light beam 230 will be.

K may depend on assembly tolerances and machining tolerances. Specifically, the value of K can refer to the assembly of the components in the display module and the error between the components. The value of K is in the range of −5 mm to 5 mm, which can ensure better imaging quality. By substituting these values, the distance h between the second light-incident surface 610 and the light emitting area 106 can be obtained. Based on the distance h between the second light-incident surface 610 and the light emitting area 106, the installation position of the second lens 120 can be determined.

In some embodiments, the range of the diagonal line length A of the display area 131 is 10 mm≤A≤200 mm. In a more specific embodiment, 5.8 mm≤A≤150 mm. For example, in the available 4.45-inch display panel, the diagonal line length A=114 mm.

In some embodiments, the range of the diagonal line length B of the light emitting area 106 is 2 mm≤B≤20 mm. A light source having the light emitting area 106 of the size in this range is easy to obtain. For example, the size of a commonly used LED die is 2 mm, while the size of a light source with a large light emitting surface is 20 mm. In a more specific embodiment, B=15.8 mm.

In some embodiments, the distance G between the light emitting area 106 and the first lens 110 is in the range of 1 mm≤G≤3.5 mm. Specifically, in order to facilitate heat dissipation, a distance of at least 1 mm should be left between the light source 105 and the first lens 110; and when G becomes larger, the size of the first lens 110 needs to be increased to effectively receive light, which is not beneficial for the display module's compact design. In a more specific embodiment, G=2 mm, which can take into account heat dissipation and module size, and achieve good optical effects.

In some embodiments, the range of h satisfies: 50 mm≤h≤150 mm. When h is greater than 150 mm, the volume of the display module is too large to be applicable. When h is less than 50 mm, it may lead to a reduction in light efficiency.

In some embodiments, the value of the distance L between the center point of the light-incident surface of the display area 131 and the center point of the second light-incident surface 610 of the second lens 120 can be directly selected within an appropriate range. The range of the distance L may be 6 mm-16 mm. Within this range, the second lens 120 is easier to assemble and has good heat dissipation performance. When L is less than 6 mm, the air duct between the display area 131 and the second lens 120 is too narrow to sufficiently dissipate heat. When L is greater than 16 mm, the air pressure will decrease, resulting in a decrease in heat dissipation. In a more specific embodiment, the distance L may be 9 mm or 11 mm.

Figure 14:
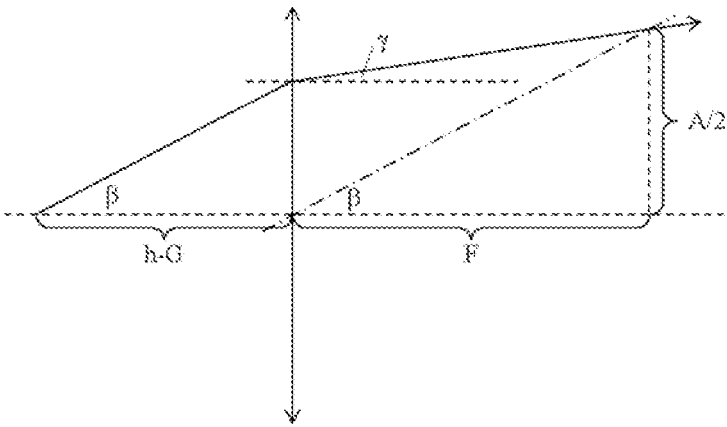
FIG. 14 schematically shows the calculation principle diagram of the focal length of the second lens.

In some embodiments, the focal length F of the second lens 120 may be determined according to the distance h between the second light-incident surface 610 and the light emitting area 106. FIG. 14 schematically shows a schematic diagram of the calculation principle of the focal length of the second lens. When the light passes through the lens, providing a parallel line of the incident light at the center of the lens, and providing a perpendicular line from the intersection point of the parallel line and the outgoing light to the optical axis, and the position of the pedal is the focal point F of the lens. It can be obtained from FIG. 14 that the focal length F of the second lens 120 satisfies the following equation:

$$F = \frac{\frac{1}{2}A - (h - G)\tan\beta}{\tan\gamma} + E \quad (17)$$

wherein, A is the diagonal line length of the display area, h is the distance between the second light-incident surface 510 and the light emitting area 106, G is the distance between the light emitting area 106 and the first lens 110, E is a constant, wherein −2.5<E≤2.5. Specifically, in equation (17), the constant E takes into account the machining tolerance and rounding tolerance of the second lens 120. Since the value of F may not be rounded after calculation, considering the convenience of the design, F should be able to be divided by 5. In this case, E can be used to adjust. For example, the adjustment method can be to adjust F to the closest number of $$\frac{\frac{1}{2}A - (h - G)\tan\beta}{\tan\gamma}$$

which can be divided by 5. When two rounded numbers have the same closeness, the larger one is taken as the focal length (for example, when $$\frac{\frac{1}{2}A - (h - G)\tan\beta}{\tan\gamma} = 72.5 \text{ mm},$$

it is adjusted to 75 mm). In some embodiments, the value of F only needs to be an integer. In this embodiment, −0.5<E≤0.5, that is, after obtaining $$\frac{\frac{1}{2}A - (h - G)\tan\beta}{\tan\gamma},$$

F can be adjusted to an integer by rounding up calculation. In some embodiments, the F value may not be an integer. It should be noted that the difference between the actual measured focal length of the second lens 120 and the above-mentioned calculated value within +/−5 mm falls within the disclosure scope of the present application.

In some embodiments, according to the size of the display area 131, the focal length F of the second lens 120 can be in the range of 50 mm-200 mm, depending on the size of the applicable display panel.

Figures 15, 16:
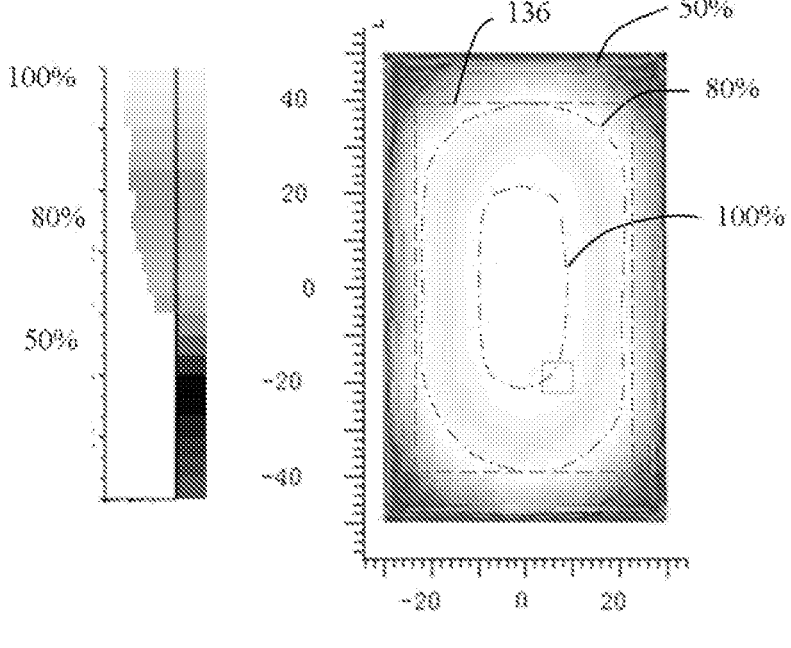
FIG. 15 schematically shows the illuminance distribution of the first irradiation area formed on the display panel by the display module according to an embodiment of the present application.
FIG. 16 schematically shows the illuminance distribution of the light source according to an embodiment of the present application.
Figure 17:
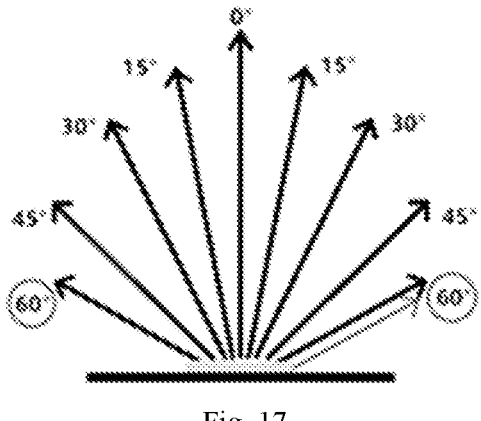
FIG. 17 schematically shows the lighting angle of the light source.

For simplicity of calculation, in the calculation of the focal length F of the second lens 120, the second lens 120 is understood as an ideal lens, that is, a lens with a thickness of 0. However, in actual use, the thickness of the second lens 120 cannot be made to be zero. In order to reduce the thickness of the second lens 120, in some embodiments, the second lens 120 may be a Fresnel lens. However, even so, the Fresnel lens still has thickness, and the thickness of the Fresnel lens can be in the range of 1.5 mm-2 mm. One surface of the Fresnel lens is a flat plane, and the other surface is engraved with multiple concentric circles, wherein the flat plane can be used as the second light-incident surface 610 of the second lens 120, and the surface engraved with multiple concentric circles can be used as the second light-exit surface 620 of the second lens 120. When performing the above calculation, the flat plane is used as the positioning plane, that is, when determining the distance between the display area and the second lens, it is the distance between the center point of the light-incident surface of the display area and the center points of the second light-incident surface of the second lens that is the object to be measured. FIG. 15 schematically shows the illuminance distribution of the first irradiation area formed on the display panel 131 by the display module according to the embodiment of the present application, wherein, area 136 schematically shows the position of the outer contour of display area 131. As shown in FIG. 15, the illuminance of any point on the outer contour 136 of the display area 131 is greater than or equal to 50% of the illuminance of the maximum illuminance point in the display area 131, and the illuminance of the entire display area is greater than 50% of the maximum illuminance, and a good display effect has been achieved.

FIG. 16 schematically shows an illuminance distribution diagram of an exemplary light source that can be used in embodiments of the present application. It can be seen from FIG. 16 that the illuminance of the light beam emitted by the light source (such as the first light beam 210) is related to the effective divergence half angle α (that is, the effective divergence angle of the light source is 2α). It can be seen from FIG. 16 that the effective divergence half angle α of the first light beam 210 is related to the illuminance of the edge light of the light source. Taking the light source shown in FIG. 16 as an example, as the effective divergence half angle of the first light beam 210 increases, the percentage of the illuminance of the edge light of the light source to the illuminance of the center light of the light source gradually decreases. In some embodiments, the range of effective divergence half angle α of the first light beam is 40°≤α≤65°. In the case that the display module selects the light source represented in FIG. 16, if it is required that the illuminance of the edge light reaches at least 50% of the maximum illuminance, α can be set to 60°.

As mentioned earlier, the better the collimation effect of the second lens 120, the smaller the effective divergence half angle γ of the third light beam 230 is. However, no matter how small the angle γ is, it cannot reach 0°. When the display module is used for the projector, it is acceptable that the γ angle does not exceed 10°.

The effective divergence half angle β of the second light beam 220 should be between α and γ. Optionally, the value of β is in the range of 25°-45°, so as to improve the collimation of the light emitted from the second lens. Preferably, the value of β is in the range of 30°-40°; further preferably, β=35°. In some embodiments, β=(α+γ)/2, which is convenient for design which achieving better light extraction effect.

In some embodiments, the display panel 130 is a liquid crystal display panel. The display area 131 of the liquid crystal display panel is used to display images. The display area 131 of the liquid crystal display panel is, for example, a rectangle.

Figure 18:
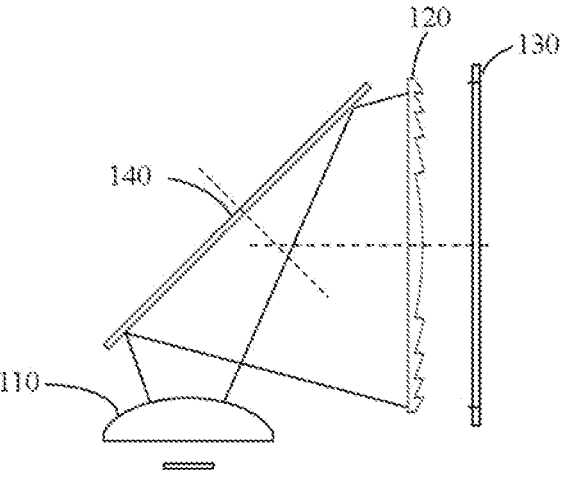
FIG. 18 schematically shows a cross-sectional view of a display module according to an embodiment of the present application.

FIG. 18 schematically shows a cross-sectional view of a display module according to an embodiment of the present application. As shown in FIG. 18, in some embodiments, the display module 100 further comprises the first reflecting mirror 140. The first reflecting mirror 140 is located at the optical downstream of the first lens 110 and the optical upstream of the second lens 120. The term optical downstream refers to the direction along which the light travels. Therefore, the light emitted by the first lens 110 will illuminate the first reflecting mirror 140. The term optical upstream refers to the direction from which light originates. Therefore, the light reflected by the first reflecting mirror 140, that is, the light emitted by the first lens 110, is reflected by the first reflecting mirror 140 onto the second lens 120. Thus, the first reflecting mirror 140 is configured to direct the second light beam 220 from the first lens 110 to the second lens 120. In some embodiments, the normal to the first reflecting mirror 140 may be at a 45° angle to the optical axis of the second lens 120. By setting the first reflecting mirror 140, the size of the display module 100 in at least one dimension can be reduced by changing the traveling direction of the light beam while the optical path remains unchanged.

It should be noted that when the display module 100 also comprises the first reflecting mirror 140, the distance h between the second light-incident surface 610 and the light emitting area 106 can be understood as the total path length of the light emitted by the light emitting area 106 which passing through the center of the light emitting area 106 along the normal and reaching the light-incident surface of the second lens 120 after being reflected by the first reflecting mirror 140. When the light emitting area 106 is a curved surface, the light emitted from the center of the light emitting area 106 is considered to be emitted from the geometric center of the flat plane area circled by the outer contour of the light emitting area 106.

Figure 19A:
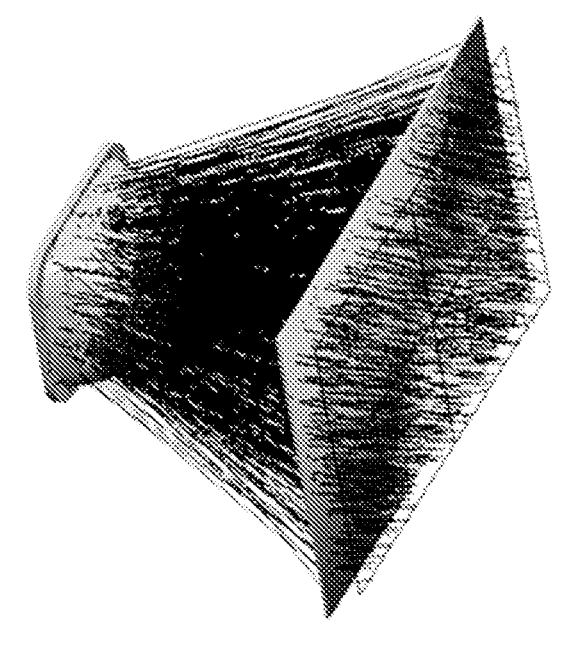
FIGS. 19A and 19B schematically show software simulation diagrams of the lighting effect of the display module according to an embodiment of the present application.
Figure 19B:
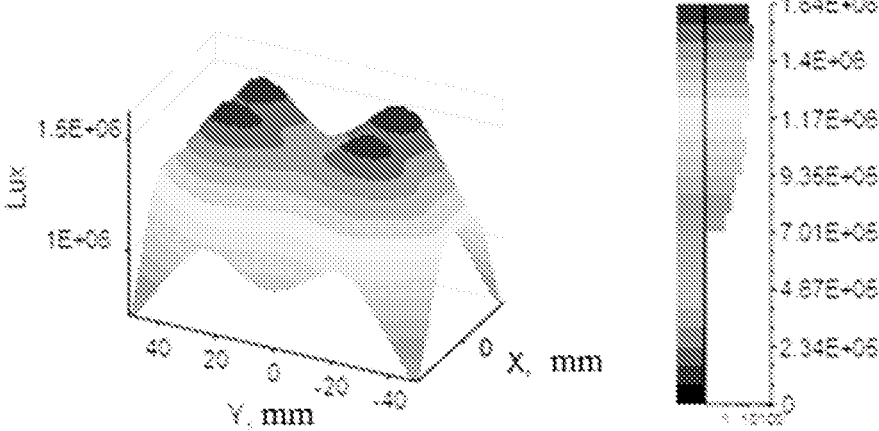

In some embodiments, the structure of the display module can be fine-tuned based on software simulation results. FIG. 19A and FIG. 19B schematically show the software simulation diagrams of the lighting effect of the display module according to the embodiment of the present application. For example, the parameters of the light source, the first lens, and the second lens described in the above embodiments are input into the simulation software, and the distances between the light source, the first lens, the second lens and the display panel are also input into the simulation software for analysis, by selecting the light emitting angle and the number of light rays, the illuminance and luminous flux can be analyzed. Based on the illuminance distribution diagram, the parameters of the lens (such as the surface structure of the lens) can be continuously optimized until the requirement parameters are reached to determine the final structure of the display module.

In summary, the light emitting structure according to the embodiment of the present application enables the light emitted by the light source to be completely incident on the display panel, and the shape and area of the outer contour of the effective display area mapped by the light source on the display panel to be limited to be close to the shape and area of the outer contour of the display area, thereby improve the optical efficiency and make the emitted light to have the required corner uniformity.

In addition to the structure itself of the display module described above, this application also provides a method for designing the display module. Through this method, the display module according to the embodiment of the present application can be designed. This method can be used to design a display module with a light source, a first lens, a second lens, and a display panel, wherein the first lens and the second lens are located between the light source and the display panel, and the first lens is closer to the light source than the second lens, the second lens is closer to the display panel than the first lens. When the dimensions of the light source and display panel are known, this method can design the parameters of the first lens and the second lens and the positional relationship between these elements, so as to achieve various optical effects described above. Specifically, in this design method, firstly, the distance between the display panel and the second lens is determined based on the heat dissipation requirements of the lighting equipment (that is, the ventilation space required by the lighting equipment to support heat dissipation). Then, based on the distance between the display panel and the second lens, the sizes of the display area of the display panel and the light emitting area of the light source, and the distance between the first lens and the light source, determine the distance between the light source and the second lens. Then, the focal length of the second lens is determined based on the distance between the light source and the second lens and the size of the display panel. After obtaining these parameters, the equations of some special curves on the light-emitting surface of the first lens can be determined according to the above equations, and these curves can be used to fit the surface to obtain the surface shape of the light-emitting surface of the first lens.

Then, provide a base for the first lens, and use simulation software for adaption to obtain the physical structure of the first lens.

Figure 21:
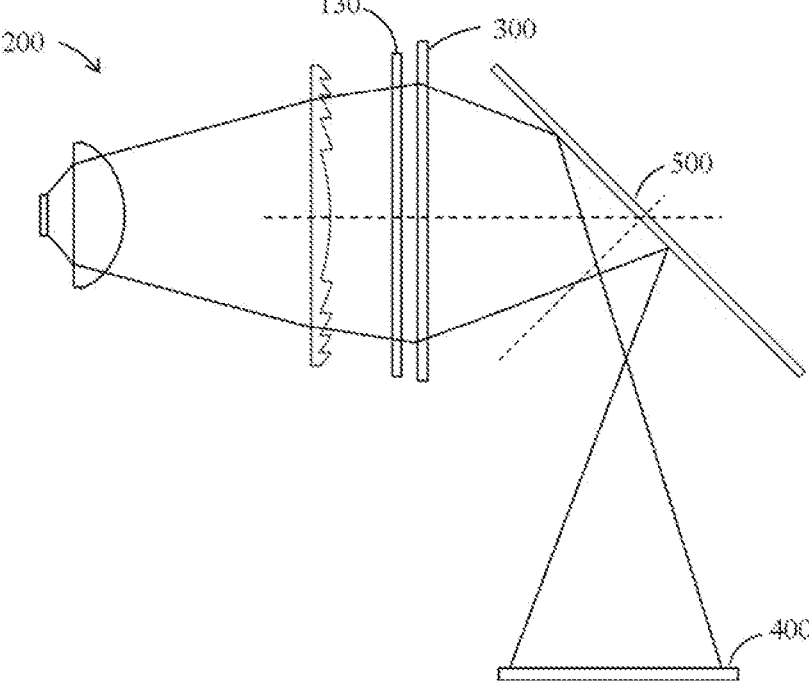
FIG. 21 schematically shows a cross-sectional view of a projector according to an embodiment of the present application.

According to another aspect of the present application, a projector is provided. FIG. 21 schematically shows a cross-sectional view of a projector according to an embodiment of the present application. The projector 200 comprises the display module 100 according to any embodiment of the present application. As shown in FIG. 21, the projector 200 further comprises a third lens 300 and a projection lens 400. The third lens 300 is located at the optical downstream of the display module 100, and the projection lens 400 is located at the optical downstream of the third lens 300. The third lens 300 can perform primary imaging on the picture displayed by the display panel 130, make the picture into an upright virtual image, and converge the light emitted from the display panel 130, so as to reduce the aperture of the lens. In some embodiments, the third lens 300 may be a Fresnel lens. The projection lens 400 can magnify imaging and improve aberration.

In some embodiments, the projector 200 further comprises the second reflecting mirror 500. The second reflecting mirror 500 is configured to reflect the light emitted by the third lens 300 to the projection lens 400. In some embodiments, the normal of the second reflecting mirror 500 may form an angle of 45° with the optical axis of the third lens 300. The projector according to the embodiment of the present application can have all the advantages and effects of the display module according to the embodiments of the present application, and will not be repeated here.

Figure 20:
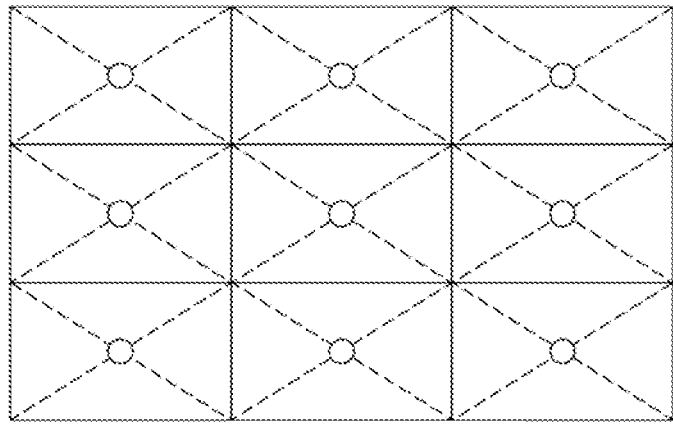
FIG. 20 schematically shows an illuminance test diagram of a display module according to an embodiment of the present application.

The inventor tested the optical performance of the projector of the embodiment of the present application, wherein the projector contains the display module of the embodiment of the present application. FIG. 20 schematically shows an illumination test diagram of the projector according to an embodiment of the present application. As shown in FIG. 20, the screen projected by the projector is divided into 9 parts, and the illuminance at the center of each part (such as the circle position in FIG. 20) is measured during measurement. The measuring equipment is Konica Minolta CL-200A color illuminance meter. By testing, the illumination uniformity of the projection screen is 61.2%, and the overall design meets the requirements.

In the description of the embodiments of the present application, the orientations or positional relationships indicated by the terms "upper", "lower", "left", "right", etc. are based on the orientations or positional relationships shown in the drawings, which are only for the convenience of description of the embodiments of the present application, without requiring that the embodiments must be constructed and operated in a particular orientation, and therefore should not be construed as limitations of the present application.

In the description of the present application, terms such as "a/one embodiment", "some/other embodiments" and the like mean that a specific feature, structure, material, or characteristic described in connection with the embodiments is comprised in at least one embodiment of the present application. Schematic representations of the above terms in the specification do not necessarily refer to the same embodiment or example. Furthermore, the specific features, structures, materials or characteristics described may be combined in any suitable manner in any one or more embodiments or examples. In addition, those skilled in the art may combine different embodiments or examples described in the present application and features of these embodiments or examples without conflicting with each other. In addition, it should be noted that in this application, the terms "first", "second" or similar terms are only used for the purpose of description or naming, and should not be understood as indicating or implying relative importance or indicating the quantity of the technical features.

The above descriptions are only specific implementations of the present application, but the protection scope of the present application is not limited thereto. Any changes or substitutions that can be easily conceived by those skilled in the art within the technical scope disclosed in this application shall fall within the protection scope of this application.

We claim:

1. A display module, comprising a light source, a first lens, a second lens, and a display panel, wherein the light source comprises a light emitting area, and the display panel comprises a display area, wherein the light source is configured to emit a first light beam to the first lens through the light emitting area, wherein the first lens is configured to receive the first light beam, refract the first light beam into a second light beam, and emit the second light beam to the second lens, wherein the second lens is configured to receive the second light beam, refract the second light beam into a third light beam, and emit the third light beam to the display panel, wherein a plane where a light-incident surface of the display panel is located comprises a first irradiation area, the first irradiation area comprises a first effective irradiation area that is continuously distributed, the first effective irradiation area comprises a strongest illumination position therein, and an illumination intensity on an outer contour of the first effective irradiation area is I % of an illumination intensity of the strongest illumination position, wherein I≥45, wherein the first lens and the second lens are configured such that the first effective irradiation area covers the display area, and, on the plane where the light-incident surface of the display panel is located, any straight line passing through a center point of the display area is intercepted by the outer contour of the first effective irradiation area as a first line segment, and is intercepted by an outer contour of the display area as a second line segment, wherein a length ratio of the first line segment to the second line segment is in a range of 1-1.3, wherein the outer contour of the display area and an outer contour of the light emitting area are rectangles, the second lens comprises a second light-incident surface and a second light-exit surface, a distance h between the second light-incident surface and the light emitting area follows a following equation:

$$h = \left( \frac{A}{2} - \frac{B}{2} - \frac{G}{\tan(90 - a)} - L\tan\gamma \right)\tan(90 - \beta) + G + K$$

wherein A is a length of a diagonal line of the display area, B is a length of a diagonal line of the light emitting area, G is a distance between the light emitting area and the first lens, L is a distance between an center point of the light-incident surface of the display area and a center point of the second light-incident surface of the second lens, α is an effective divergence half angle of the first light beam, β is an effective divergence half angle of the second light beam, γ is an effective divergence half angle of the third light beam, K is a constant, and K is in a range of −5 mm≤K≤5 mm.

2. The display module of claim 1, wherein on the plane where the light-incident surface of the display panel is located, a difference between a length of the first line segment and a length of the second line segment is in a range of 0-30 mm.

3. The display module of claim 1, wherein the second lens comprises the second light-incident surface and the second light-exit surface, the second light beam comprises a second irradiation area on a plane where the second light-incident surface is located, the second irradiation area comprises a second effective irradiation area, the second effective irradiation area is mapped as the first effective irradiation area on the plane where the light-incident surface of the display panel is located by the second lens, wherein the second lens is configured such that an area of the second effective irradiation area is 90% to 110% of an area of the display area.

4. The display module of claim 1, wherein a shape of an outer contour of the light emitting area is same as a shape of the outer contour of the display area.

5. The display module of claim 1, wherein the outer contour of the first effective irradiation area is a trapezoid, and the outer contour of the display area is a rectangle, a long side and a short side of the trapezoid are respectively in parallel with two sides of the outer contour of the display area, and legs of the trapezoid are angled with other two sides of the outer contour of the display area.

6. The display module of claim 1, wherein the first lens comprises a first light-incident surface and a first light-exit surface, the first light-incident surface is configured to receive the first light beam, the first light-exit surface is configured to emit the second light beam to the second lens, the second lens comprises the second light-incident surface and the second light-exit surface, and an outer contour of the light emitting area is a rectangle, wherein a first coordinate system is defined with a center point of the light emitting area being an origin point, a straight line where a diagonal line of the light emitting area is located being a x-axis, and an central normal of the light emitting area being a y-axis, wherein, in the first coordinate system, a first ray emitted by the light source to the first lens is refracted into a second ray by the first light-incident surface, and the second ray is refracted into a third ray by the first light-exit surface, wherein an intercepted line of an effective light-exit area of the first light-exit surface on the first coordinate system is a first intercepted line, and any point $(x_1, y_1)$ on the first intercepted line follows a following equation:

$$
\begin{cases}
x_1 = \dfrac{h - G - T_{ix1}\sin\beta_{i1} + S_{ix1}\sin\theta_{i1}}{\sin\theta_{i1} - \sin\beta_{i1}} + M \\[2ex]
y_1 = \left(\dfrac{h - G - T_{ix1}\sin\beta_{i1} + S_{ix1}\sin\theta_{i1}}{\sin\theta_{i1} - \sin\beta_{i1}} - S_{ix1}\right)\sin\theta_{i1} + G + N
\end{cases}
$$

wherein h is the distance between the second light-incident surface and the light emitting area, G is the distance between the light emitting area and the first light-incident surface, $S_{ix1}$ is a distance from an intersection point of the first ray and the first light-incident surface to the central normal of the light emitting area, $T_{ix1}$ is a distance from an intersection point of the third ray and the second light-incident surface to the central normal of the light emitting area, $\beta_{i1}$ is an angle between the third ray and the central normal of the light emitting area, $\theta_{i1}$ is an angle between the second ray and the central normal of the light emitting area, M and N are constants, wherein 0≤M≤4, 0≤N≤4.

7. The display module of claim 1, wherein the first lens comprises a first light-incident surface and a first light-exit surface, the first light-incident surface is configured to receive the first light beam, the first light-exit surface is configured to emit the second light beam to the second lens, the second lens comprises the second light-incident surface and the second light-exit surface, and an outer contour of the light emitting area is a rectangle, wherein a second coordinate system is defined with a center point of the light emitting area being an origin point, an extension direction of a long side of the light emitting area being a direction of an x-axis, and a central normal of the light emitting area being a y-axis, wherein, in the second coordinate system, a first ray emitted by the light source to the first lens is refracted into a second ray by the first light-incident surface, and the second ray is refracted into a third ray by the first light-exit surface, wherein an intercepted line of an effective light-exit area of the first light-exit surface on the second coordinate system is a second intercepted line, and any point $(x_2, y_2)$ on the second intercepted line follows a following equation:

$$
\begin{cases}
x_2 = \dfrac{h - G - T_{ix2}\sin\beta_{i2} + S_{ix2}\sin\theta_{i2}}{\sin\theta_{i2} - \sin\beta_{i2}} + P \\[2ex]
y_2 = \left(\dfrac{h - G - T_{ix2}\sin\beta_{i2} + S_{ix2}\sin\theta_{i2}}{\sin\theta_{i2} - \sin\beta_{i2}} - S_{ix2}\right)\sin\theta_{i2} + G + Q
\end{cases}
$$

wherein h is the distance between the second light-incident surface and the light emitting area, G is the distance between the light emitting area and the first light-incident surface, $S_{ix2}$ is a distance from an intersection point of the first ray and the first light-incident surface to the central normal of the light emitting area, $T_{ix2}$ is a distance from an intersection point of the third ray and the second light-incident surface to the central normal of the light emitting area, $\beta_{i2}$ is an angle between the third ray and the central normal of the light emitting area, $\theta_{i2}$ is an angle between the second ray and the central normal of the light emitting area, P and Q are constants, wherein 0≤P≤3, 0≤Q≤3.

8. The display module of claim 1, wherein the first lens comprises a first light-incident surface and a first light-exit surface, the first light-incident surface is configured to receive the first light beam, the first light-exit surface is configured to emit the second light beam to the second lens, the second lens comprises the second light-incident surface and the second light-exit surface, and an outer contour of the light emitting area is a rectangle, wherein a third coordinate system is defined with a center point of the light emitting area being an origin point, an extension direction of a short side of the light emitting area being a direction of an x-axis, and a central normal of the light emitting area being an y-axis, wherein, in the third coordinate system, a first ray emitted by the light source to the first lens is refracted into a second ray by the first light-incident surface, and the second ray is refracted into a third ray by the first light-exit surface, wherein an intercepted line of an effective light-exit area of the first light-exit surface on the third coordinate system is a third intercepted line, and any point $(x_3, y_3)$ on the third intercepted line follows a following equation:

$$\begin{cases} x_3 = \dfrac{h - G - T_{ix3}\sin\beta_{i3} + S_{ix3}\sin\theta_{i3}}{\sin\theta_{i3} - \sin\beta_{i3}} + C \\ y_3 = \left( \dfrac{h - G - T_{ix3}\sin\beta_{i3} + S_{ix3}\sin\theta_{i3}}{\sin\theta_{i3} - \sin\beta_{i3}} - S_{ix3} \right)\sin\theta_{i3} + G + V \end{cases}$$

wherein h is the distance between the second light-incident surface and the light emitting area, G is the distance between the light emitting area and the first light-incident surface, $S_{ix3}$ is a distance from an intersection point of the first ray and the first light-incident surface to the central normal of the light emitting area, $T_{ix3}$ is a distance from an intersection point of the third ray and the second light-incident surface to the central normal of the light emitting area, $\beta_{i3}$ is an angle between the third ray and the central normal of the light emitting area, $\theta_{i3}$ is an angle between the second ray and the central normal of the light emitting area, C and V are constants, wherein $0 \leq C \leq 2$, $0 \leq V \leq 2$.

9. The display module of claim 6, wherein the first light-incident surface is a flat plane, and the first light-exit surface is a curved surface.

10. The display module of claim 1, wherein the second lens comprises the second light-incident surface and the second light-exit surface, and the distance h between the second light-incident surface and the light emitting area is in a range of 50 mm≤h≤150 mm, and/or the length A of the diagonal line of the display area is in a range of 10 mm≤A≤200 mm and/or the length B of the diagonal line of the light emitting area is in a range of 2 mm≤B≤20 mm, and/or the distance G between the light emitting area and the first lens is in a range of 1 mm≤G≤3.5 mm, and/or the distance L between the center point of the light-incident surface of the display area and the center point of the second light-incident surface is in a range of 6 mm≤L≤16 mm.

11. The display module of claim 1, wherein the second lens comprises the second light-incident surface and the second light-exit surface, a focal length F of the second lens follows a following equation:

$$F = \frac{\frac{1}{2}A - (h - G)\tan\beta}{\tan\gamma} + E$$

wherein A is the length of a diagonal line of the display area, h is the distance between the second light-incident surface and the light emitting area, G is the distance between the light emitting area and the first lens, E is a constant, $\beta$ is the effective divergence half angle of the second light beam, $\gamma$ is the effective divergence half angle of the third light beam, wherein −2.5 mm≤E≤2.5 mm.

12. The display module of claim 1, wherein a focal length F of the second lens is in a range of 50 mm≤F≤200 mm.

13. The display module of claim 1, wherein the effective divergence half angle $\alpha$ of the first light beam is in a range of 40°≤α≤65°, and/or the effective divergence half angle $\gamma$ of the third light beam is in a range of 0°≤γ≤10°, and/or the effective divergence half-angle $\beta$ of the second light beam is in a range of 25°≤β≤45°.

14. The display module of claim 1, wherein the effective divergence half angle $\alpha$ of the first light beam, the effective divergence half angle $\beta$ of the second light beam, and the effective divergence half angle $\gamma$ of the third light beam follow a following equation:

$\beta = (\alpha + \gamma)/2$.

15. The display module of claim 1, wherein the second lens is a Fresnel lens, and a thickness of the second lens along its optical axis is in a range of 1.5 mm-2 mm.

16. The display module of claim 1, wherein the display panel is a liquid crystal display panel.

17. The display module of claim 1, further comprising a first reflecting mirror, wherein the first reflecting mirror is at an optical downstream of the first lens and an optical upstream of the second lens, and the first reflecting mirror is configured to reflect the second light beam from the first lens to the second lens.

18. A projector, comprising the display module according to claim 1, a third lens, and a projection lens, wherein the third lens is at an optical downstream of the display module, and the projection lens is at an optical downstream of the third lens.

19. The projector of claim 18, further comprising a second reflecting mirror, wherein the second reflecting mirror is configured to reflect a light emitted by the third lens to the projection lens.

\* \* \* \* \*